United States Patent
Wendt

(10) Patent No.: US 7,433,489 B2
(45) Date of Patent: Oct. 7, 2008

(54) METHOD TO ENSURE TEMPORAL SYNCHRONIZATION AND REDUCE COMPLEXITY IN THE DETECTION OF TEMPORAL WATERMARKS

(75) Inventor: Peter D. Wendt, Mahwah, NJ (US)

(73) Assignees: Sony Electronics Inc., Park Ridge, NJ (US); Sony Corporation (JP)

( * ) Notice: Subject to any disclaimer, the term of this patent is extended or adjusted under 35 U.S.C. 154(b) by 701 days.

(21) Appl. No.: 10/882,055

(22) Filed: Jun. 30, 2004

(65) Prior Publication Data
US 2005/0117775 A1 Jun. 2, 2005

Related U.S. Application Data

(63) Continuation-in-part of application No. 10/383,831, filed on Mar. 7, 2003, now Pat. No. 6,782,117, which is a continuation of application No. 09/996,648, filed on Nov. 28, 2001, now Pat. No. 6,563,937.

(51) Int. Cl.
*G06K 9/00* (2006.01)
(52) U.S. Cl. .................................... 382/100
(58) Field of Classification Search ................ 382/100; 358/3.28; 713/176; 348/535
See application file for complete search history.

(56) References Cited

U.S. PATENT DOCUMENTS

| | | | |
|---|---|---|---|
| 4,313,984 A | 2/1982 | Moraw et al. | |
| 5,084,790 A | 1/1992 | Endoh | |
| 5,144,658 A | 9/1992 | Takahashi | |
| 5,809,139 A | 9/1998 | Girod et al. | |
| 5,915,027 A | 6/1999 | Cox et al. | |
| 6,047,374 A | 4/2000 | Barton | |
| 6,108,434 A | 8/2000 | Cox et al. | |
| 6,141,441 A | 10/2000 | Cass et al. | |
| 6,282,299 B1 | 8/2001 | Tewfik et al. | |

(Continued)

FOREIGN PATENT DOCUMENTS

EP    0778566    6/1997

(Continued)

OTHER PUBLICATIONS

Shelby Pereira and Thierry Pun, "An Iterative Template Matching Algorithm Using The Chirp-Z Transform for Digital Image Watermarking," Pattern Recognition, vol. 33, Issue 1, Jan. 2000, pp. 173-175.

(Continued)

*Primary Examiner*—Matthew C. Bella
*Assistant Examiner*—Dennis Rosario
(74) *Attorney, Agent, or Firm*—Lerner, David, Littenberg, Krumholz & Mentlik, LLP

(57) ABSTRACT

A method and/or apparatus for embedding and detecting a watermark among a plurality of frames of data is disclosed, where the watermark is correlated with a plurality of noise blocks, and the noise blocks are summed over a plurality of respective video frames. Each noise block is preferably subjected to a fade function with another noise block over the plurality of respective video frames to make the embedded watermark resistant to changes in data frame rate or other temporal distortions in the frames of data. Detection and recovery of such an embedded watermark and its fade function is also provided.

8 Claims, 16 Drawing Sheets

U.S. PATENT DOCUMENTS

| | | | |
|---|---|---|---|
| 6,282,300 B1 | 8/2001 | Bloom et al. | |
| 6,370,272 B1 * | 4/2002 | Shimizu | 382/232 |
| 6,381,341 B1 | 4/2002 | Rhoads | |
| 6,385,329 B1 * | 5/2002 | Sharma et al. | 382/100 |
| 6,404,926 B1 | 6/2002 | Miyahara et al. | |
| 6,424,725 B1 | 7/2002 | Rhoads et al. | |
| 6,442,283 B1 | 8/2002 | Tewfik et al. | |
| 6,463,162 B1 | 10/2002 | Vora | |
| 6,556,689 B1 | 4/2003 | Xia et al. | |
| 6,563,937 B1 | 5/2003 | Wendt | |
| 6,567,533 B1 | 5/2003 | Rhoads | |
| 6,603,576 B1 * | 8/2003 | Nakamura et al. | 358/3.28 |
| 6,680,972 B1 | 1/2004 | Liljeryd et al. | |
| 7,277,557 B2 * | 10/2007 | Ihara | 382/100 |
| 2001/0036292 A1 | 11/2001 | Levy et al. | |
| 2002/0090107 A1 | 7/2002 | Acharya et al. | |
| 2003/0012402 A1 | 1/2003 | Ono | |
| 2003/0021439 A1 | 1/2003 | Lubin et al. | |
| 2003/0215112 A1 | 11/2003 | Rhoads et al. | |

FOREIGN PATENT DOCUMENTS

| | | |
|---|---|---|
| EP | 0 967 803 | 12/1999 |
| EP | 1 202 552 | 5/2002 |
| GB | 2 349 536 | 11/2000 |
| JP | 11-341452 | 12/1999 |
| JP | 2001-078010 A | 3/2001 |
| WO | WO 97/26733 | 7/1997 |

OTHER PUBLICATIONS

M. Kutter, S.K. Bhattacharjee and T. Ebrahimi, "Towards Second Generation Watermarking Schemes," IEEE Article, pp. 320-323, 1999.

Solachidis, et al., "Circularly Symmetric Watermark Embedding in 2-D DFT Domain," IEEE Article, pp. 3469-3472, 1999.

Licks, V., et al., "On Digital Image Watermarking Robust To Geometric Transformations," IEEE Article, pp. 690-693, 2000.

Ni, Z., et al., "Enhancing Robustness of Digital Watermarking against Geometric Attack Based on Fractal Transform," IEEE Article, pp. 1033-1036, 2000.

Alghoniemy, M., et al., "Image Watermarking By Moment Invariants," IEEE Article, pp. 73-76, 2000.

Tefas, A., et al., "Multi-Bit Image Watermarking Robust To Geometric Distortions," IEEE Article, pp. 710-713, 2000.

Termont, P., et al., "How To Achieve Robustness Against Scaling In A Real-Time Digital Watermarking System For Broadcast Monitoring," IEEE Article, pp. 407-410, 2000.

Hong, M., et al., "A Private/Public Key Watermarking Technique Robust To Spatial Scaling," IEEE Article, pp. 102-103, 1999.

Chotikakamthorn, N., et al., "Ring-shaped Digital Image Watermark for Rotated and Scaled Images Using Random-Phase Sinusoidal Function," IEEE Article, pp. 321-325, 2001.

O Ruanaidh, J., et al., "Rotation, Scale and Translation Invariant Digital Image Watermarking," IEEE Article, pp. 536-539, 1997.

Lin, C., et al., "Rotation, Scale, and Translation Resilient Watermarking for Images," IEEE Article, pp. 767-782, 2001.

Tsekeridou, S., et al., "Copyright Protection of Still Images Using Self-Similar Chaotic Watermarks," IEEE Article, pp. 411-414, 2000.

Lu, C., et al., "Video Object-Based Watermarking: A Rotation and Flipping Resilient Scheme," IEEE Article, pp. 483-486, 2001.

Pereira, S., et al., "Template Based Rocovery of Fourier-Based Watermarks Using Log-polar and Log-log Maps," IEEE Article, pp. 870-874, 1999.

Tsekeridou, S., et al., "Wavelet-Based Self-Similar Watermarking For Still Images," IEEE Article, pp. I-220-I-223, 2000.

Mora-Jimenez, I., et al., "A New Spread Spectrum Watermarking Method With Self-Synchronization Capabilties," IEEE Article, pp. 415-418, 2000.

Pereira, S., et al., "Robust Template Matching for Affine Resistant Image Watermarks," IEEE Article, pp. 1123-1129, 2000.

Caldelli, R., et al. "Geometric-Invariant Robust Watermarking Through Constellation Matching In The Frequency Doman," IEEE Article, pp. 65-68, 2000.

Burak Ozer, I., et al., "A New Method For Detection Of Watermarks In Geometrically Distorted Images," IEEE Article, pp. 1963-1966, 2000.

Delannay, D., et al., "Generalized 2-D Cyclic Patterns For Secret Watermark Generation," IEEE Article, pp. 77-79, 2000.

Hel-Or, H.Z., et al., "Geometric Hashing Techniques For Watermarking," IEEE Article, pp. 498-501, 2001.

Voloshynovskiy, S., et al., "Multibit Digital Watermarking Robust Against Local Nonlinear Geometrical Distortions," IEEE Article, pp. 999-1002, 2001.

Anderson, R., et al., "Information Hiding An Annotated Bibliography," Computer Laboratory, University of Cambridge, pp. 1-62, Aug. 13, 1999.

Kutter, M., et al., "Towards Second Generation Watermarking Schemes," IEEE Article, pp. 320-323, 1999.

Kaewkamnerd, N., et al., "Wavelet Based Watermarking Detection Using Multiresolution Image Registration," IEEE Article, pp. II-171-II-175, 2000.

Termont, P., et al., "Performance Measurements of a Real-time Digital Watermarking System for Broadcast Monitoring," IEEE Article, pp. 220-224, 1999.

Maes, M., et al., "Exploiting Shift Invariance to Obtain a High Payload in Digital Image Watermarking," IEEE Article, pp. 7-12, 1999.

Linnartz, J., et al., "Detecting Electronic Watermarks In Digital Video," Philips Research pp. 1-4. Mar. 15-19, 1999, pp. 2071-2074.

Petitcolas, F., et al., "Information Hiding—A Survey," IEEE Article, pp. 1062-1078, 1999.

Kutter, M., "Watermarking Resisting to Translation, Rotation, and Scaling," Signal Processing Laboratory, Swiss Federal Institute of Technology. Proc. of SPIE, Jan. 1999, pp. 412-422.

Braudaway et al., "Automatic recovery of invisible image watermarks from geometrically distorted images," Proc. SPIE vol. 3971: Security and Watermarking of Multimedia Contents II, Jan. 2000, pp. 74-81.

Alghoniemy et al., "Geometric Distortion Correction Through Image Normalization," Proc. IEEE Int. Conf. on Multimedia and Expo 2000, vol. 3, Jul./Aug. 2000 pp. 1291-1294.

Kusanagi et al., "An Image Correction Scheme for Video Watermarking Extraction," IEICE Trans. Fundamentals, vol. E84-A, No. 1, Jan. 2001, pp. 273-280.

Delannay et al., "Compensation of Geometrical Deformations for Watermark Extraction in the Digital Cinema Application," Proc. SPIE vol. 4314: Security and Watermarking of Multimedia Contents III, Jan. 2001, pp. 149-157.

Su et al., "Synchronized Detection of the Black-based Watermark with Invisible Grid Embedding," Proc. SPIE vol. 4314: Security and Watermarking of Multimedia Contents III, Jan. 2001, pp. 406-417.

Loo et al., "Motion estimation based registration of geometrically distored images of watermark recovery," Proc. SPIE vol. 4314: Security and Watermarking of Multimedia Contents III, Jan. 2001, pp. 606-617.

Su et al., "A Content Depending Spatially Localized Video Watermark for Resistance to Collusion and Interpolation Attacks," IEEE Proc. Int. Conf. on Image Processing, vol. 1, Oct. 2001, pp. 818-821.

Cox, et al., "Secure Spread Spectrum Watermarking for Multimedia," NEC Research Institute Technical Reports, 1995, pp. 1-33.

Berghel, et al., "Protecting ownership rights through digital watermarking," Internet Kiosk, XP 000613936, Jul. 1996, pp. 101-103.

Zhicheng Ni, Eric Sung and Yun Q. Shi, "Enhancing Robustness of Digital Watermarking against Geometric Attack Based on Fractal Transform," IEEE Article, pp. 1033-1036, 2000.

Ching-Yung Lin, Min Wu, Jeffrey A. Bloom, Ingemar J. Cox, Matt L. Miller and Yui Man Lui, "Rotation, Scale, and Translation Resilient Watermarking for Images," IEEE Article, pp. 767-782, 2001.

V. Solachidis and I. Pitas, "Curcularly Symmetric Watermark Embedding 2-D DFT Domain," IEEE Article, pp. 3469-3472, 1999.

V. Licks, R. Jordan, "On Digital Image Watermarking Robust To Geometric Transformations," IEEE Article, pp. 690-693, 2000.

Zhicheng, Ni, Eric Sung and Yun Q. Shi, "Enchancing Robustness of Digital Watermarking Against Geometric Attack Based on Fractal Transform," IEEE, pp. 1033-1036, 2000.

* cited by examiner

| 1 | 1 | 1 | 1 | -1 | -1 | -1 | -1 |
|---|---|---|---|----|----|----|----|
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |
| -1 | -1 | -1 | -1 | 1 | 1 | 1 | 1 |
| -1 | -1 | -1 | -1 | 1 | 1 | 1 | 1 |
| -1 | -1 | -1 | -1 | 1 | 1 | 1 | 1 |
| -1 | -1 | -1 | -1 | 1 | 1 | 1 | 1 |

| -1 | -1 | -1 | -1 | 1 | 1 | 1 | 1 |
|----|----|----|----|---|---|---|---|
| -1 | -1 | -1 | -1 | 1 | 1 | 1 | 1 |
| -1 | -1 | -1 | -1 | 1 | 1 | 1 | 1 |
| -1 | -1 | -1 | -1 | 1 | 1 | 1 | 1 |
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |

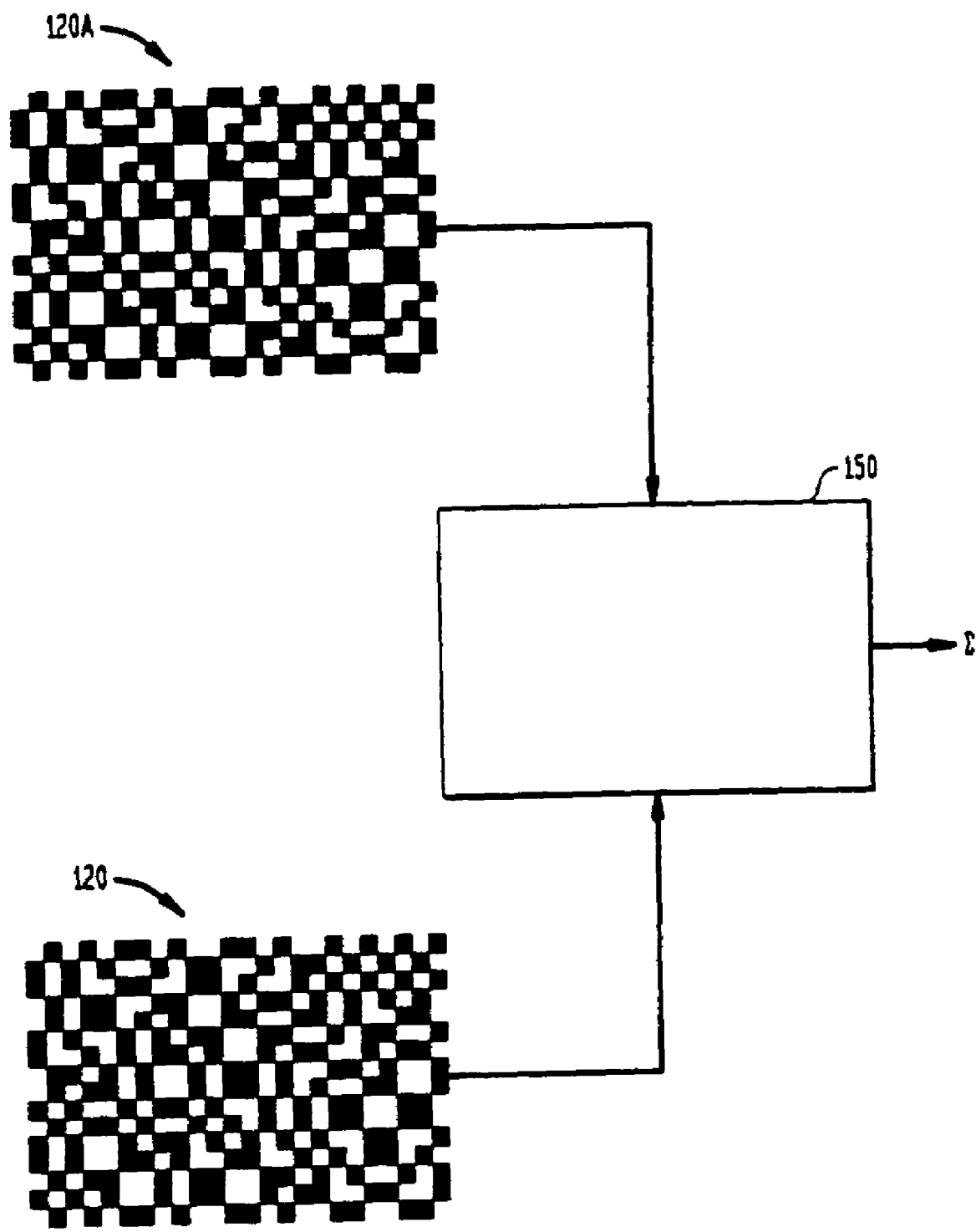

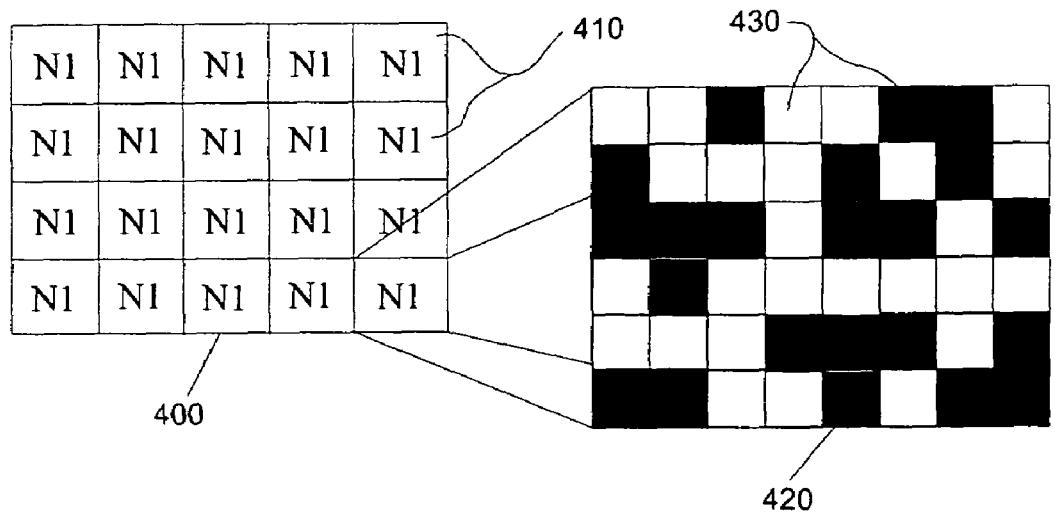
N=15
T=3
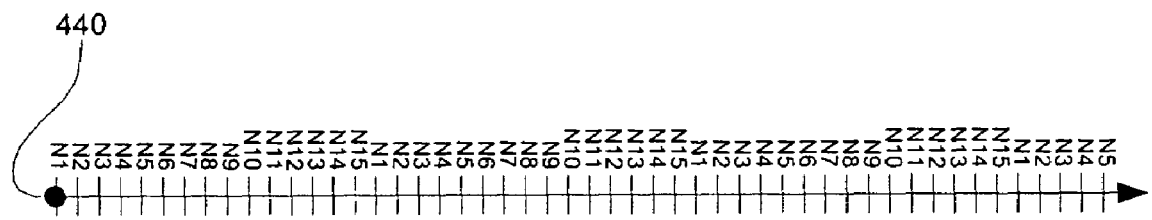
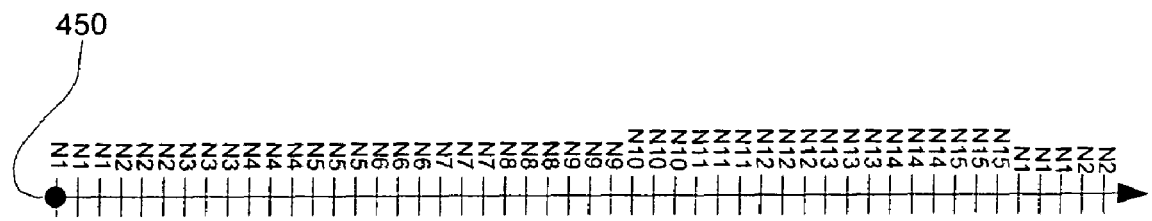
FIG. 11

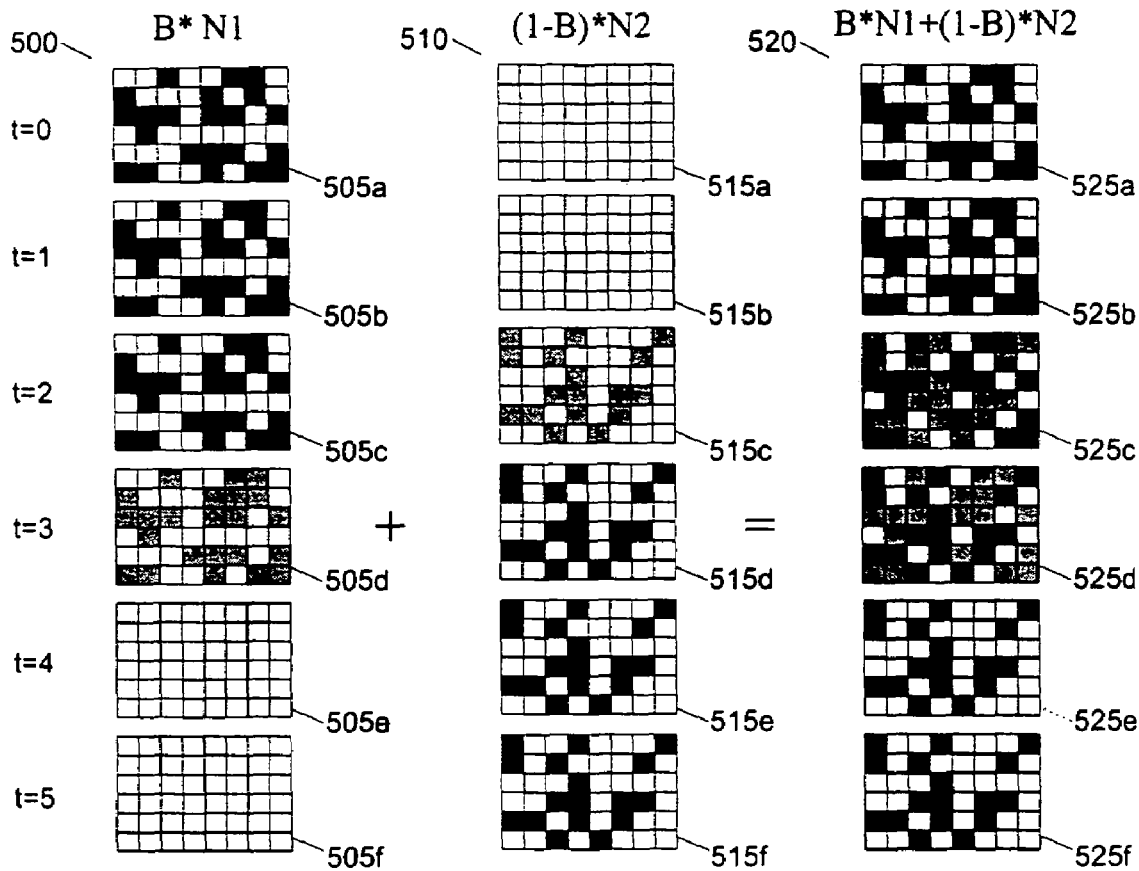
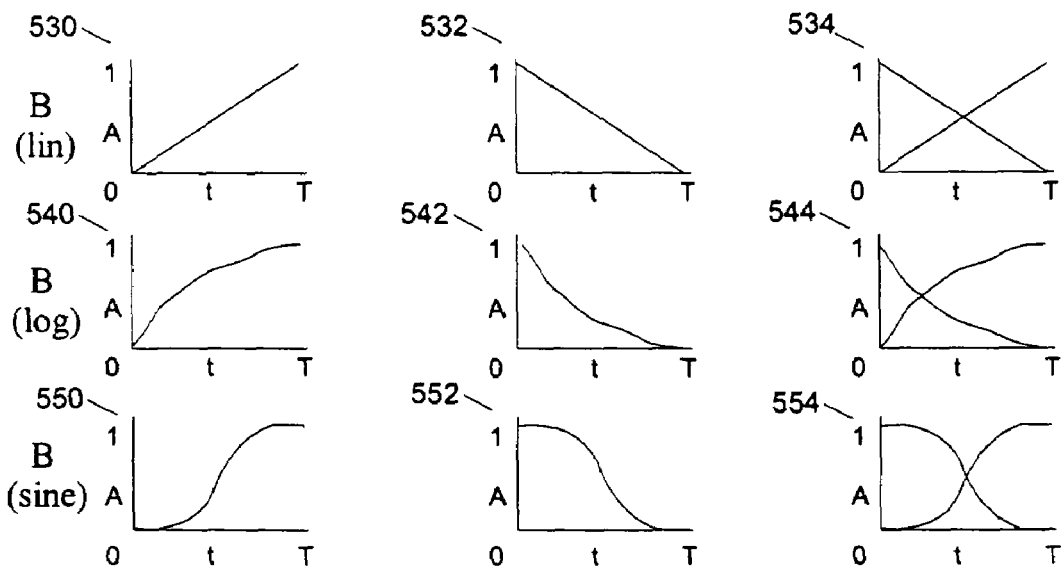
FIG. 12

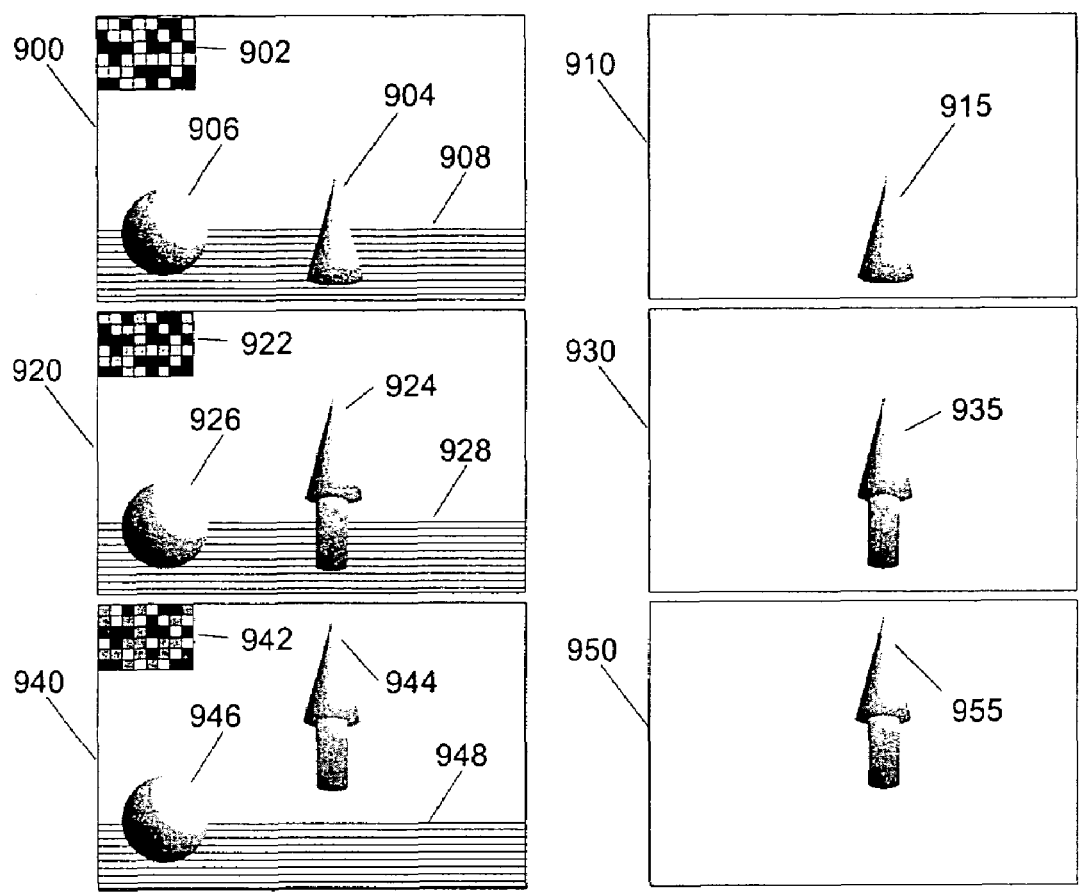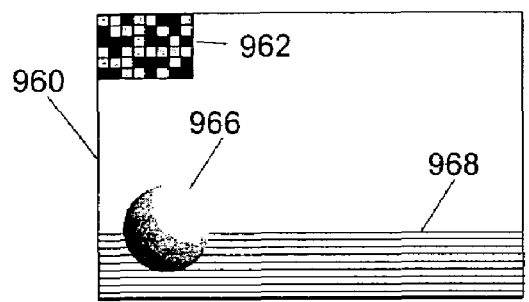
FIG. 16

METHOD TO ENSURE TEMPORAL SYNCHRONIZATION AND REDUCE COMPLEXITY IN THE DETECTION OF TEMPORAL WATERMARKS

CROSS-REFERENCE TO RELATED APPLICATIONS

The present application is a continuation-in-part of U.S. patent application Ser. No. 10/383,831, entitled METHOD AND APPARATUS TO DETECT WATERMARK THAT ARE RESISTANT TO ARBITRARY DEFORMATIONS, filed Mar. 7, 2003, now U.S. Pat. No. 6,782,117 which is a continuation of U.S. patent application Ser. No. 09/996,648, now U.S. Pat. No. 6,563,937, entitled METHOD AND APPARATUS TO DETECT WATERMARK THAT ARE RESISTANT TO ARBITRARY DEFORMATIONS, filed Nov. 28, 2001 both of which are assigned to the assignee of the present application and hereby incorporated by reference in their entirety.

BACKGROUND OF THE INVENTION

The present invention relates to the detection of one or more watermarks embedded in frames of a moving image and, more particularly, the present invention relates to methods and/or apparatuses for detecting a watermark that are resistant to arbitrary temporal frame deformation and frame rate conversion.

It is desirable to the publishers of content data, such as movies, video, music, software, and combinations thereof to prevent or deter the pirating of the content data. The use of watermarks has become a popular way of thwarting pirates. A watermark is a set of data containing a hidden message that is embedded in the content data and stored with the content data on a storage medium, such as film, a digital video disc (DVD), a compact disc (CD), a read only memory (ROM), a random access memory (RAM), magnetic media, etc. The hidden message of the "embedded watermark" is typically a copy control message, such as "do not copy" or "copy only once."

In the movie industry, the hidden message of the watermark may be an identifier of a particular location (e.g., theater) at which a movie is shown. If the management of the theater knowingly or unknowingly permits pirate to record the movie, the identity of that theater may be obtained by detecting the hidden message of the watermark embedded in a pirated copy of the movie. Corrective action may then be taken.

With respect to watermark detection, when a quantum of data comprising the content data and the embedded watermark is correlated with a reference watermark, a determination can be made as to whether the embedded watermark is substantially similar to, or the same as, the reference watermark. If a high correlation exists, then it may be assumed that the message of the embedded watermark corresponds to a message of the reference watermark. For example, the quantum of data may be a frame of data, such as video data, in which pixel data of the frame of video data has been embedded with a watermark ("the embedded watermark"). Assuming that the frame of data has not been distorted in some way, when a reference watermark that is substantially the same as the embedded watermark is correlated with the frame of video data, a relatively high output is obtained. This is so because a one-for-one correspondence (or registration) between the data of the embedded watermark and the data of the reference watermark will tend to increase a correlation computation. Conversely, if the embedded watermark contained in the frame of video data has been altered in a way that reduces the one-for-one correspondence between the embedded watermark and the reference watermark, the correlation will yield a relatively low result.

Often, the correlation computation involves performing a sum of products of the data contained in the frame of data and the data of the reference watermark. Assuming that the frame of data and the reference watermark include both positive values and negative values, the sum of products will be relatively high when the data of the embedded watermark aligns, one-for-one, with the data of the reference watermark. Conversely, the sum of products will be relatively low when the data of the embedded watermark does not align with the reference watermark.

A data detector, such as a standard correlation detector or matched filter, may be used to detect the presence of an embedded watermark in a frame of content data, such as video data, audio data, etc. The original or reference position of the embedded watermark is implicitly determined by the design of the hardware and/or software associated with the detector. These types of correlation detectors are dependent upon specific registration (i.e., alignment) of the embedded watermark and the reference watermark.

Pirates seeking to wrongfully copy content data containing an embedded watermark (e.g., one that proscribes copying via a hidden message: "do not copy") can bypass the embedded watermark by distorting the registration (or alignment) between the embedded watermark and the reference watermark. By way of example, a frame of content data containing an embedded watermark may be slightly rotated, resized, and/or translated from an expected position to a position that would prevent a one-for-one correspondence (perfect registration) between the embedded watermark and the reference watermark. Editing and copying equipment may be employed to achieve such distortion.

An embedded watermark contained in a pirated copy of a movie may also have been distorted. A pirate may intentionally distort the embedded watermark as discussed above or the distortion may unintentionally occur during the recording process at a theater. For example, if the pirated copy was recorded, using a video camera, several factors can cause distortion including (i) shaking of the video camera (especially if it is handheld); (ii) misalignment of the video camera with the projected movie (e.g., when the video camera is on a tripod); (iii) lens distortion in the video camera (intentional and/or non-intentional); and (iv) projection screen abnormalities (e.g., curvature).

Further, inadvertent distortion of the embedded watermark may occur during the normal processing of the content data (containing an embedded watermark) in a computer system or consumer device. For example, the content data (and embedded watermark) of a DVD may be inadvertently distorted while undergoing a formatting process, e.g., that converts the content data from the European PAL TV system to the US NTSC TV system, or vice versa. Alternatively, the content data and embedded watermark may be distorted through other types of formatting processes, such as changing the format from a wide-screen movie format to a television format. Indeed, such processing may inadvertently resize, rotate, and/or translate the content data and, by extension, the embedded watermark, rendering the embedded watermark difficult to detect. Such editing may also create temporal distortions in movie frames, and may require frame rate conversion or frame compression that distorts or destroys watermark information.

Different types of watermark systems exist that purport to be robust to resizing and translation. One such type of watermark system typically embeds the watermark in a way that is mathematically invariant to resizing and translation. The detector used in this type of system does not have to adjust to changes in the position and/or size of the embedded watermark. Such a system is typically based on Fourier-Mellin transforms and log-polar coordinates. One drawback of such a system is that it requires complex mathematics and a particularly structured embedded watermark pattern and detector. This system cannot be used with pre-existing watermarking systems.

Another type of prior art watermark system uses repetitive watermark blocks, wherein all embedded watermark blocks are identical. The watermark block in this type of system is typically large and designed to carry the entire copy-control message. The repetition of the same block makes it possible to estimate any resizing of the embedded watermark by correlating different portions of the watermarked image and finding the spacing between certain positions. The resizing is then inverted and the reference block is correlated with the adjusted image to find the embedded watermark and its position simultaneously. An example of this system is the Philips VIVA/JAWS+watermarking system. A disadvantage of such a system is that the design of the embedded watermark must be spatially periodic, which does not always occur in an arbitrary watermarking system.

Yet another type of watermarking system includes an embedded template or helper pattern along with the embedded watermark in the content data. The detector is designed to recognize the reference location, size and shape of the template. The detector attempts to detect the template and then uses the detected position of the template to estimate the actual location and size of the embedded watermark. The system then reverses any geometric alterations so that the correlation detector can detect and interpret the embedded watermark. This system is disadvantageous, however, since the templates tend to be fragile and easily attacked.

In the present inventor's U.S. Pat. No. 6,563,937, entitled METHOD AND APPARATUS TO DETECT WATERMARK THAT ARE RESISTANT TO ARBITRARY DEFORMATIONS, assigned to the assignee of the present application and hereby incorporated by reference in its entirety, a method to use temporally-varying watermark patterns to detect and estimate geometric deformations in digital video is described. That temporally-varying watermarking system overcomes the effect of many deformations that can disadvantageously defeat the detection of previous types of watermarks in video. Overcoming the effect of video deformations is especially important for watermarks designed to defeat or track illegal copying.

The temporally-varying embedder embeds a rectangular array of substantially identical noise blocks into each frame. Within each frame, the noise block pattern repeated is identical, but the noise block pattern to be repeated typically varies from frame to frame. Thus, for each sequence of N noise blocks, each noise block is repeated in one of N frames, after which the sequence of N noise blocks repeats in the next N frames. Generally, the sequence of noise blocks used in the frames repeats over the entire video. Also, all the noise blocks have the same size, and are aligned, tiled, and/or overlayed over all the frames.

One location is typically selected to be the center of all the noise blocks. At this location, a sequence of values is created. If the temporal correlation of this sequence is computed with respect to an aligned set of watermarked frames, a frame with bright spots at the centers of all the noise blocks in the watermarked frames will advantageously be derived.

A temporal correlator is a specialized temporal filter—for each pixel position in each frame, a linear weighted combination of the values in that pixel position in neighboring frames is computed. Since this should be done for typically every pixel position in the frame, the corresponding linear combination of the neighboring video frames, pixel by pixel, is advantageously computed.

In the case that it is known that the embedded watermark and the temporal sequence of coefficients are synchronized, so that frame 1 corresponds to coefficient 1, frame 2 to coefficient 2, etc., and that the sequences of embedded watermark patterns repeats over time, then computation time in the detector and storage space in the detector are advantageously reduced.

Similarly, in the case that the temporal sequence of watermark patterns consists of N frames, and therefore that the coefficient sequence has length N, then the input video is advantageously divided into blocks of N frames. The correct linear combination of the frames in each block can than be computed to produce one output frame for the block. Advantageously buffering of input frames is not needed, because of the block-by-block processing. Rather than buffering, the weighted frames are accumulated into one output frame buffer. This frame buffer is reset to all zeros at the start of each block of frames.

However, this process is rendered more complex if it is not known whether the sequence of watermark patterns and the sequence of coefficients are synchronized.

Furthermore, if there is an unknown offset shift between the start of the sequence of coefficients and the sequence of watermark patterns, the combination of N frames for each input frame should be computed until a frame with bright spots is found. Only then is the offset shift known, and only then can the block-of-frames method described above be employed.

If, in addition, though, the frame rate of the video has been changed, then the temporal correlation will not work at all. Nor will the process for determining the offset shift via the combination of N frames for each input frames typically be effective. Thus, an effective solution for recovering watermarks from frame rate conversion and temporal shifts is needed.

SUMMARY OF THE INVENTION

In accordance with one or more aspects of the invention, a method and/or apparatus is capable of detecting a watermark among a plurality of reproduced frames of data, the reproduced frames of data having been derived from respective original frames of data includes: adding at least some of the reproduced frames of data together on a data point-by-data point basis to obtain an aggregate frame of data points; selecting peak data points of the aggregate frame of data points; computing correction information from deviations between the positions of the peak data points within the aggregate frame and expected positions of those peak data points; modifying positions of at least some of the data of at least some of the reproduced frames of data using the correction information such that those reproduced frames of data more closely coincide with respective ones of the original frames of data; and detecting the watermark from among the modified reproduced frames of data.

The marker data points within each of the original frames of data are located at substantially the same relative positions and the reproduced marker data points within each of the reproduced frames of data are located at substantially the same relative positions. Preferably, the set of marker data points are arranged in a grid. Each peak data point of the aggregate frame of data points corresponds to a sum of the reproduced marker data points that are located at substantially the same relative position within respective ones of at least some of the M reproduced frames of data. The expected positions of the peak data points within the aggregate frame of data points are the corresponding positions of the marker data points within the original frames of data.

Preferably, the method and/or apparatus further includes: grouping the peak data points and their associated reproduced marker data points and marker data points into respective sets of three or more; comparing the respective positions of the peak data points of each set with the positions of the associated set of marker data points; computing respective sets of correction information based on the comparison of the sets of peak data points and marker data points, each set of correction information corresponding to a respective area within each of the reproduced frames of data circumscribed by the reproduced marker data points associated with the peak data points of the set of correction information; and modifying the positions of the data in each of the respective areas of at least one of the reproduced frames of data in accordance with the associated sets of correction information.

In accordance with at least one further aspect of the present invention, a method and/or apparatus is capable of detecting a watermark among a plurality of reproduced frames of data, the reproduced frames of data having been derived from respective original frames of data, N of the reproduced frames of data each including a plurality of reproduced blocks of noise data corresponding with blocks of noise data distributed within N of the original frames of data. The method and/or apparatus includes: deriving peak data points from the reproduced blocks of noise data of the N reproduced frames of data, the peak data points being positioned within an aggregate frame of data points; computing correction information from deviations between the positions of the peak data points within the aggregate frame and expected positions of those peak data points; modifying positions of at least some of the data of at least some of the reproduced frames of data using the correction information such that those reproduced frames of data more closely coincide with respective ones of the original frames of data; and detecting the watermark from among the modified reproduced frames of data.

The step of deriving the peak data points preferably includes: selecting one of the noise data of one of the blocks of noise data of an i-th one of the N frames of the original frames of data, where i=1, 2, ... N; multiplying the data of an i-th one of the N frames of the reproduced frames of data by the selected one of the noise data to produce an i-th modified reproduced frame of data; and summing the modified reproduced frames of data on a point-by-point basis to obtain the aggregate frame of data points, wherein the peak data points are those having substantially higher magnitudes than other data points of the aggregate frame of data.

The method preferably further includes: grouping into respective sets of three or more: (i) the peak data points, (ii) the reproduced data points of the N reproduced frames of data at relative positions corresponding to the peak data points, and (iii) the associated selected noise data points; comparing the respective positions of the peak data points of each set with the positions of the associated set of selected noise data points; computing respective sets of correction information based on the comparison of the sets of peak data points and noise data points, each set of correction information corresponding to a respective area within each of the reproduced frames of data circumscribed by the reproduced data points of the N reproduced frames of data at relative positions corresponding to the peak data points; and modifying the positions of the data in each of the respective areas of at least one of the reproduced frames of data in accordance with the associated sets of correction information.

In accordance with one aspect of the present invention, a method of placing a watermark in a video comprising a plurality of frames is disclosed, comprising: creating a plurality of noise blocks in a repeating sequence representing watermark data adding each noise block to a predetermined number of the plurality video frames; fading from each noise block to the next noise block in the repeating sequence over the predetermined number of the plurality video frames via a fading function during the adding step; and, repeating the adding and fading step for substantially all of the video frames.

In accordance with one aspect of the present invention, a system for watermarking a video including a plurality of video frames is disclosed, comprising: at least a first noise block and a second noise block representing watermark data; at least a first video frame and a second video frame associated with the first noise block, the first noise block added to the at least first video frame and second video frame so as to tile substantially all of each video frame; and, at least a third video frame and a fourth video frame associated with the second noise block, the second noise block added to the at least third video frame and fourth video frame so as to tile substantially all of each video frame.

In accordance with another embodiment of the present invention, a method for detecting a watermark in a plurality of video frames is disclosed, comprising: windowing the plurality of video frames into frame windows; providing a finite impulse response filter to obtain an output frame for at least some of the frame windows; determining the absolute value of each the output frame; summing the absolute values of each the output frame to obtain a sequence of spatial accumulation values for each output frame; and, recovering the watermark based on the spatial accumulation sequence.

In accordance with yet another embodiment of the present invention, a system for detecting a watermark in a video including a plurality of video frames is disclosed, comprising: a first frame window and a second frame window, the first frame window and the second frame window each including a plurality of sequential video frames, each video frame composed of at least a two dimensional array of pixels; a finite impulse response filter, the finite impulse response filter filtering the first frame window and the second frame window to provide a first output frame and a second output frame; an absolute value filter, the absolute value filter filtering the first output frame and the second output frame to provide a first absolute output frame and a second absolute output frame; a summer, the summer summing the pixels of the first absolute output frame to provide a first spatial accumulation value and summing the pixels of the second absolute output frame to provide a second spatial accumulation value; and, a watermark recognizer, the watermark recognizer recognizing a watermark from the sequence of the first spatial accumulation value and the second spatial accumulation value. In accordance with a further aspect of this embodiment of the present invention, further included is a fast Fourier filter, the fast Fourier filter filtering the spatial accumulation sequence to determine a fade pattern for removing noise from the spatial accumulation sequence.

In accordance with a further aspect of this embodiment of the present invention, further included is a spatial prefilter, the spatial prefilter prefiltering a subset of the plurality of video frames before providing the finite impulse response filter.

In accordance with a further aspect of this embodiment of the present invention, further included is a temporal prefilter, the temporal prefilter prefiltering a subset of the video frames before providing the finite impulse response filter.

In yet another aspect of one embodiment of the present invention, a system for embedding a watermark in a plurality of video frames over frame time t, comprising: a set of video frames V(0) to V(M) where M is an integer and M>1; a set of noise blocks B(0) to B(N) where N is an integer and 1<N<M; a stretch value T designating the number of video frames a particular noise block is repeated in, where 1<T<N; a fade function f(t) for fading between a first noise block and a second noise block in a set of T video frames; and, an adder for adding the set of noise blocks B(0) to B(N) repeatedly to each N*T frames of the set of video frames via the fade function.

Further features and aspects of the invention will be apparent to one skilled in the art in view of the discussion herein taken in conjunction with the accompanying drawings.

BRIEF DESCRIPTION OF THE DRAWINGS

For the purposes of illustrating the invention, there are shown in the drawings forms that are presently preferred, it being understood, however, that the invention is not limited to the precise arrangements and instrumentalities shown.

FIG. 3 is a graphical illustration of some additional details of the watermark of FIG. 2;

FIG. 4 is a graphical illustration of further details of the watermark of FIG. 2;

FIG. 8 is a graphical illustration of an example of detecting a watermark in a frame of data;

FIG. 11 is a conceptual block diagram illustrating one embodiment of the use of temporally stretched noise blocks in image frames.

FIG. 12 is a conceptual block diagram illustrating one embodiment of the fading of temporally stretched noise blocks over a number of frames.

FIG. 16 is a conceptual diagram illustrating one embodiment of temporal prefiltering illustrating to remove large changes is pixels over time before decoding.

DETAILED DESCRIPTION

Figure 1:
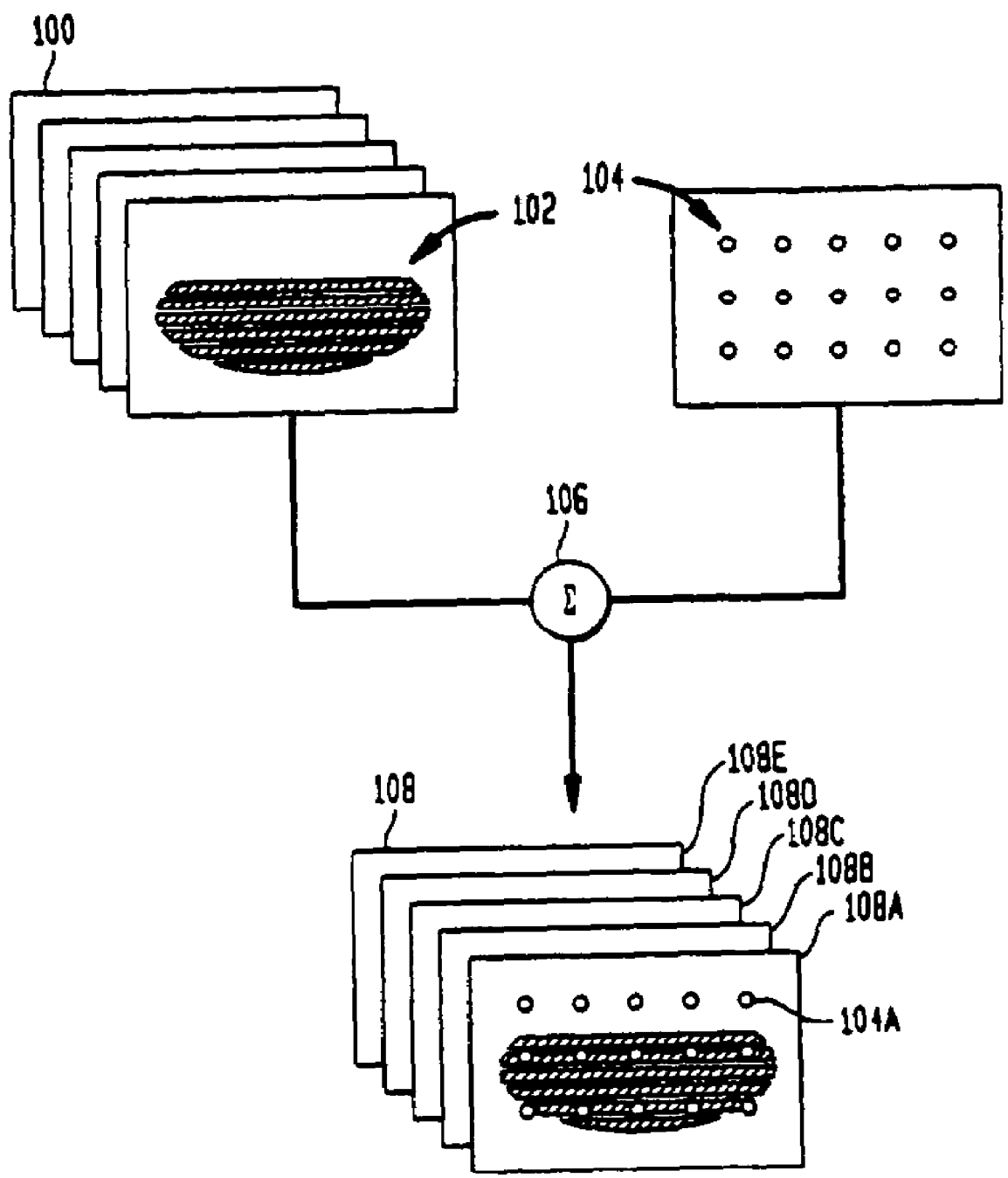
FIG. 1 is a conceptual block diagram illustrating an example of embedding marker data points into one or more frames of data in accordance with one or more aspects of the present invention.

Referring now to the drawings wherein like numerals indicate like elements, there is shown in FIG. 1 a conceptual block diagram illustrating the use of marker data points in accordance with one or more aspects of the present invention.

An "original movie" to be shown in a theater includes many frames of data. Prior to distribution of the movie to a particular theater, a plurality of frames of data 100 containing content data 102 are preferably modified to include a number of marker data points 104, preferably arranged in a grid. In particular, the pattern of marker data points 104 are preferably embedded into at least some of the frames of data 100, for example, by way of a summing unit 106. The output of the summing unit 106 is a plurality of frames of data 108, each containing the pattern of marker data points 104 as well as the content data 102. The frames of data 108 may represent substantially all of the frames of data of the movie or may be a subset of such frames of data, for example, N frames of data. The frames of data 108 may be referred to herein as "original frames of data" 108 because they are intended to represent the physical media (i.e., movie film) that is used by a theater to project a movie onto a projection screen.

A given marker data point 104 is preferably located at a single point within a frame of data 108, for example, at a single pixel location. It is understood, however, that practical limitations may require that a given marker data point 104 covers two or more data locations (e.g., pixel locations). Preferably, the marker data points 104 within each of the N frames of data 108 are located at substantially the same relative positions. In other words, if an original frame of data 108A contains an embedded marker data point 104A at a particular position within the frame, then another original frame of data 108B preferably also includes an embedded marker data point 104B (not shown) at substantially the same relative position as marker data point 104A within that frame. This arrangement preferably applies with respect to substantially all of the marker data points 104 and substantially all of the N original frames of data 108.

One or more of the original frames of data 108 preferably also include an embedded watermark containing a hidden message, for example, an identifier of the theater at which the original frames of data 108 (i.e., the movie) are to be shown.

Figure 2:
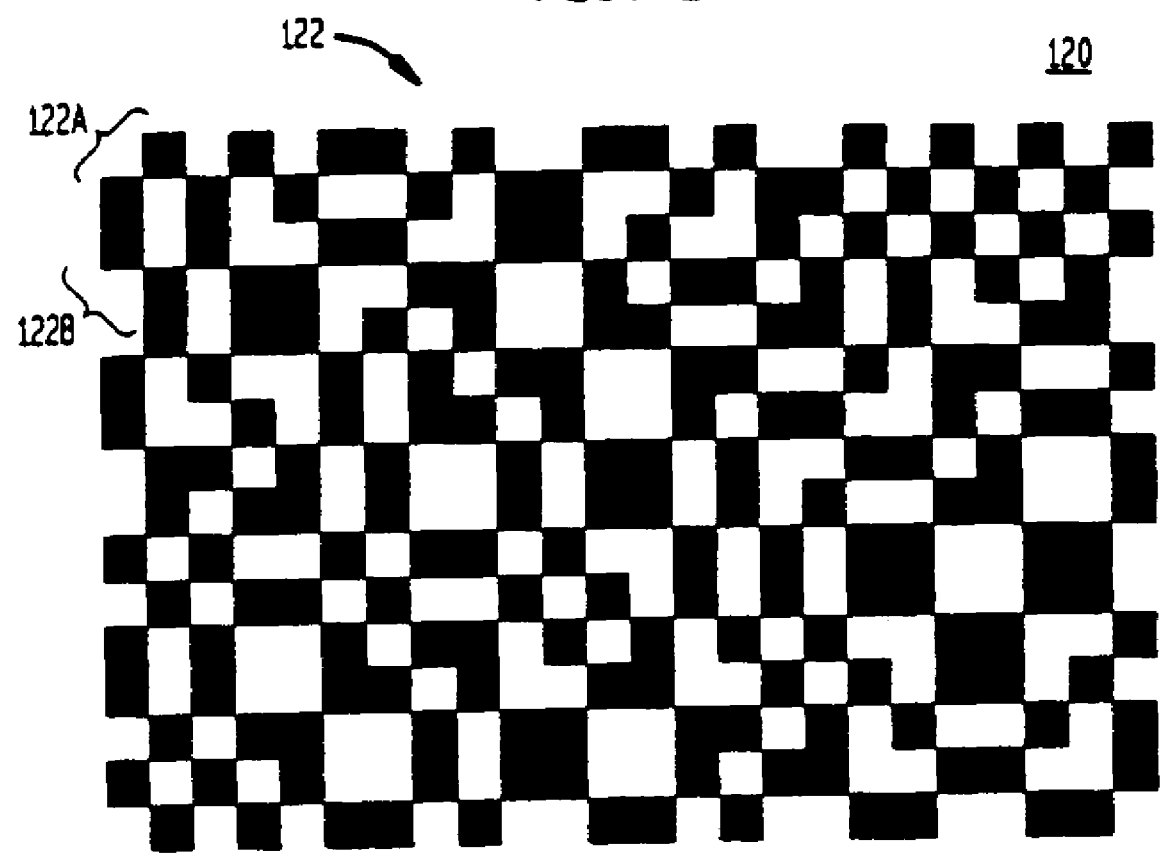
FIG. 2 is a graphical illustration of a preferred block based watermark suitable for use with the present invention.

Referring to FIG. 2, a general block-based structure of a preferred watermark 120 in accordance with at least one aspect of the present invention is shown. The data of the watermark 120 may be embedded in the content data 102, in which case the watermark 120 is referred to herein as an "embedded watermark" 120. It is noted, however, that the watermark 120 may represent a desired configuration for a watermark embedded in a frame of data (e.g., having not been distorted), in which case the watermark 120 would be referred to herein as a "reference watermark" 120.

Preferably, the watermark 120 includes a plurality of data blocks 122, each data block 122 having an array of data values (such as pixel values, etc.). The array of each data block 122 is preferably a square array, although a non-square array may also be employed without departing from the scope of the invention. The data values of each data block 122 are arranged in one of a plurality of patterns. As shown, the data blocks 122 of the watermark 120 preferably include data values arranged in either a first pattern or a second pattern. For example, data block 122A may be of the first pattern and data block 122B may be of the second pattern.

Reference is now made to FIG. 3, which illustrates further details of a data block 122 of the first pattern, such as data block 122A. Assuming a Cartesian system of coordinates, the first pattern may be defined by four quadrants of data values, where the first and third quadrants have equal data values and the second and fourth quadrants have equal data values. By way of example, the data values of the first and third quadrants may represent negative magnitudes (e.g., −1) and are shown as black areas in FIG. 2, while the data values of the second and fourth quadrants may represent positive magnitudes (e.g., +1) and are shown as white areas in FIG. 2. With reference to FIG. 4, the second pattern (e.g. data block 122B) may also be defined by four quadrants of data values, where the first and third quadrants have equal data values and the second and fourth quadrants have equal data values. In contrast to the first pattern, however, the data values of the first and third quadrants of the second pattern may represent positive magnitudes (white areas in FIG. 2), while the data values of the second and fourth quadrants may represent negative magnitudes (black areas in FIG. 2).

One of the first and second patterns of data values, for example the first pattern (e.g., data block 122A), preferably represents a logic state, such as one, while the other pattern, for example the second pattern (e.g., data block 122B), represents another logic state, such as zero. The array of data blocks 122 of the watermark 120 therefore may represent a pattern of logic states (e.g., ones and zeros) defining the hidden message in the frame of data.

Notably, the data values of the first pattern and the data values of the second pattern consist of two opposite polarity magnitudes (e.g., +1 and −1) such that a sum of products of the data values of a data block 122 having the first pattern (e.g., 122A) and a data block 122 having the second pattern (e.g., 122B) is a peak number, either positive or negative, although in the example herein, the sum of magnitudes is a peak negative number (because the products of the data values are all −1). In keeping with the example above, a sum of products of the data values of a data block 122 having the first pattern (122A) and a data block 122 having the second pattern (122B) is a peak positive number when one of the data blocks 122A, 122B is rotated by 90° with respect to the other data block. This is so because the products of the data values are all +1 when one of the data blocks 122A, 122B is rotated by 90°. As will be apparent to one skilled in the art from the discussion below, these properties of the watermark 120 enable improved accuracy in the detection of an embedded watermark in a frame of data, even when the embedded watermark has been "geometrically" altered in some way e.g., rotated, resized, translated, etc.

It is noted that the basic structure of the watermark 120 is given by way of example only and that many variations and modifications may be made to it without departing from the scope of the invention. For robustness, it is preferred that the watermark 120 be formed by blocks of data, e.g., data blocks 122, that exhibit certain properties. For example, it is preferred that each data block 122 contain values that are substantially equal (e.g., constant) along any radius from a center of the data block 122 to its boundary (or perimeter). For example, the data blocks 122A and 122B of FIGS. 3 and 4 are either +1 or −1 along any such radius. As will be apparent from the disclosure herein, this ensures robustness in detecting an embedded watermark despite resizing (e.g., increasing magnification, decreased magnification, changes in aspect ratio, etc.).

Any of the known processes may be employed to embed the watermark 120 of FIG. 2 into one or more frames of content data, such as the frames of data 100 of FIG. 1. In general, a basic embedder (such as the summing unit 106, FIG. 1) may be employed to aggregate (e.g., add) the data of the watermark 120 to the data of the one or more frames of data 100 on a point-by-point basis to obtain one or more original frames of data 108 that include the content data and the embedded watermark 120.

Figure 5:
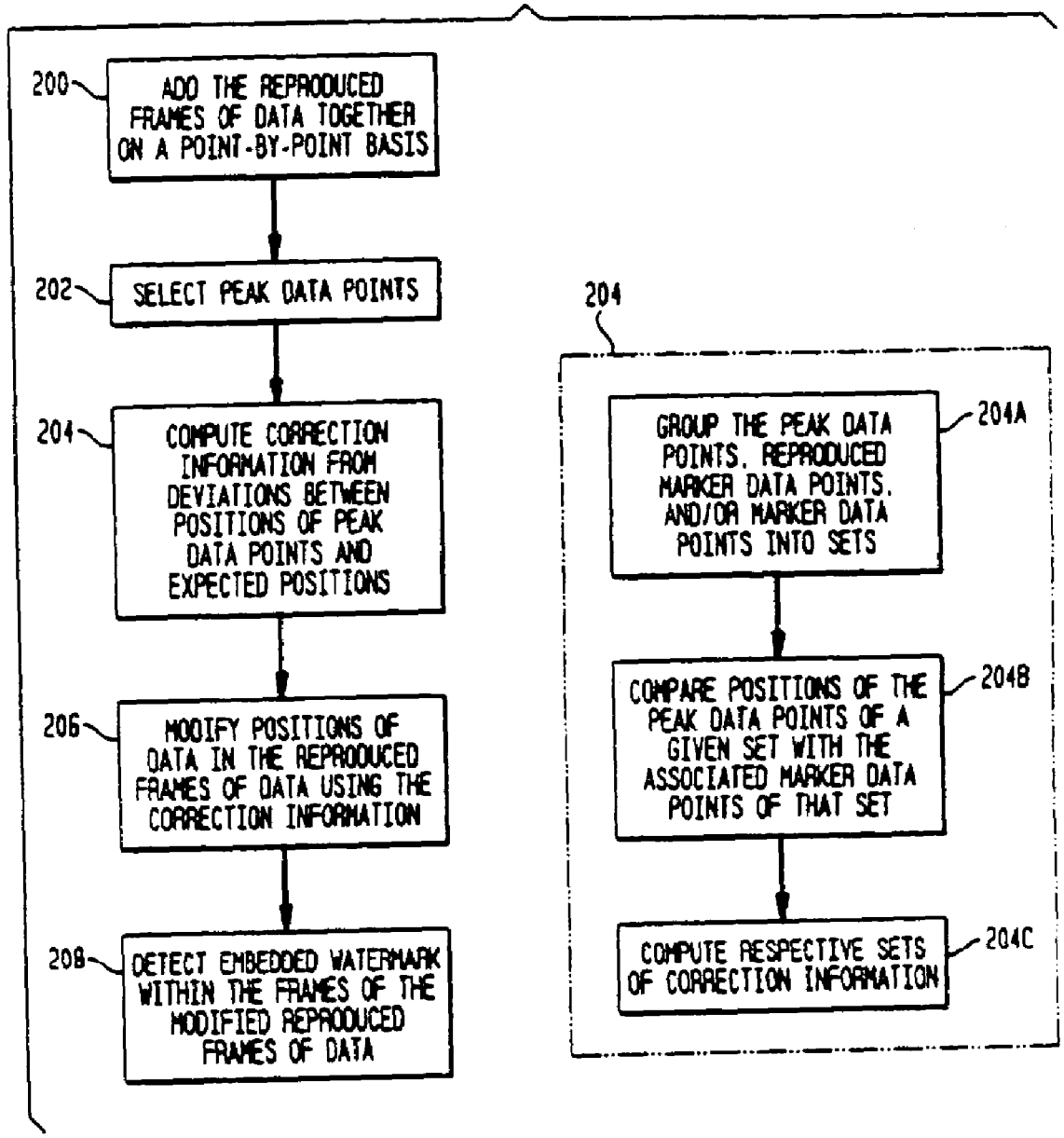
FIG. 5 is a flow diagram illustrating certain actions and/or functions in accordance with one or more aspects of the present invention.
Figure 6:
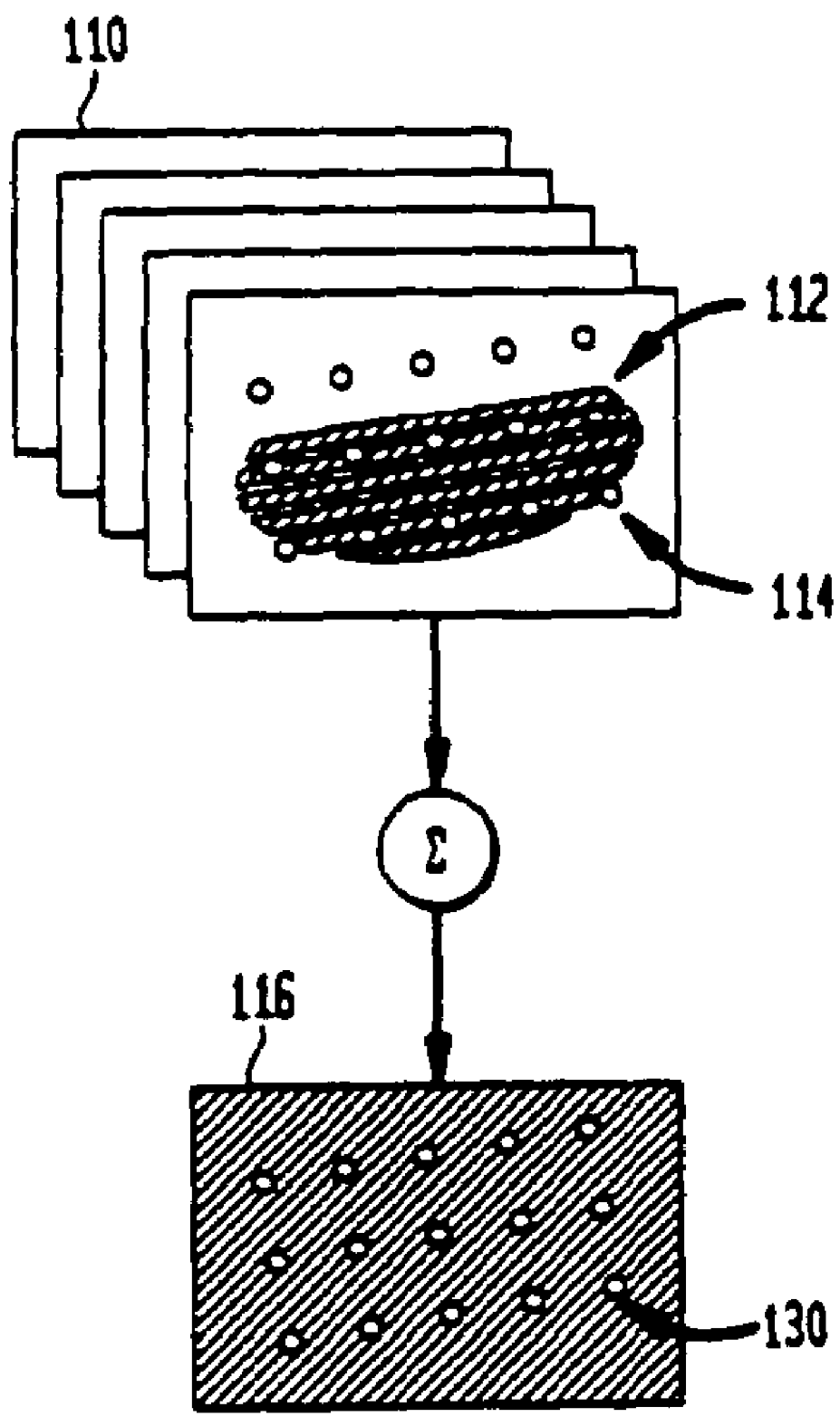
FIG. 6 is a conceptual block diagram illustrating the detection of reproduced marker data points contained in one or more reproduced frames of data in accordance with one or more aspects of the present invention.

Reference is now made to FIG. 5, which is a flow diagram illustrating certain actions and/or functions that are preferably carried out in accordance with one or more aspects of the present invention. By way of introduction, and with further reference to FIGS. 1 and 6, the original frames of data 108 are assumed to have been reproduced in some way, for example, recorded using a video camera. A plurality of reproduced frames of data 110 (e.g., M frames of data) are shown in FIG. 6. Each reproduced frame of data 110 corresponds with one of the original frames of data 108 and includes reproduced content data 112 and reproduced marker data points 114. Each reproduced marker data point 114 of a given one of the reproduced frames of data 110 corresponds with one of the marker data points 104 of a corresponding one of the original frames of data 108. Thus, just as the marker data points 104 within each of the N original frames of data are located at substantially the same relative positions, the reproduced marker data points 114 within each of the M reproduced frames of data 110 are likewise located at substantially the same relative positions.

The reproduced content data 112, the reproduced marker data points 114, and the embedded watermark 120 may have been subject to various types of distortion during or after the pirating process. By way of example, the content 102 and the marker data points 104 from the original frames of data 108 may have been slightly rotated within each reproduced frame of data 110 as compared to the original frames of data 108. This rotation may be due to, for example, misalignment of the video camera with respect to the projection screen in the theater when the reproduced frames of data 110 were pirated.

Turning again to FIG. 5, at action 200, reproduced frames of data are added together on a point-by-point basis. It is preferred that all of the reproduced frames of data 110 that correspond with the N original frames of data 108 containing marker data points 104 are added together to produce an aggregate frame of data points 116. It is understood, however, that all of the reproduced frames of data 110 need not be added together; indeed, a subset of the reproduced frames of data 110 that contain reproduced marker data points 114 may be added together on a point-by-point basis to obtain the aggregate frame data points 116.

It is assumed that whatever distortion was introduced into the reproduced frames of data 110 during the pirating process is substantially consistent from frame to frame. Consequently, the summation of the reproduced frames of data 110 containing the reproduced marker data points 114 will tend to cause peak data points 130 to appear in the aggregate frame of data points 116. These peak data points 130 should appear substantially at the locations of the reproduced marker data points 114 within the reproduced frames of data 110. This is so because each peak data point 130 of the aggregate frame of data points 116 corresponds to a sum of the reproduced marker data points 114 that are located at substantially the same relative position within respective ones of the reproduced frames of data 110. Other data points within the aggregate frame of data points 116 will likely be of significantly lower magnitude because the reproduced content data 112 will likely average out over the summation of the reproduced frames of data 110.

At action 202, the peak data points 130 are preferably selected (or identified) from among the other data points within the aggregate frame of data points 116. It is noted that the distortion introduced either intentionally or unintentionally during the pirating process is reflected in the positions of the peak data points 130 within the aggregate frame of data points 116.

Figure 7A:
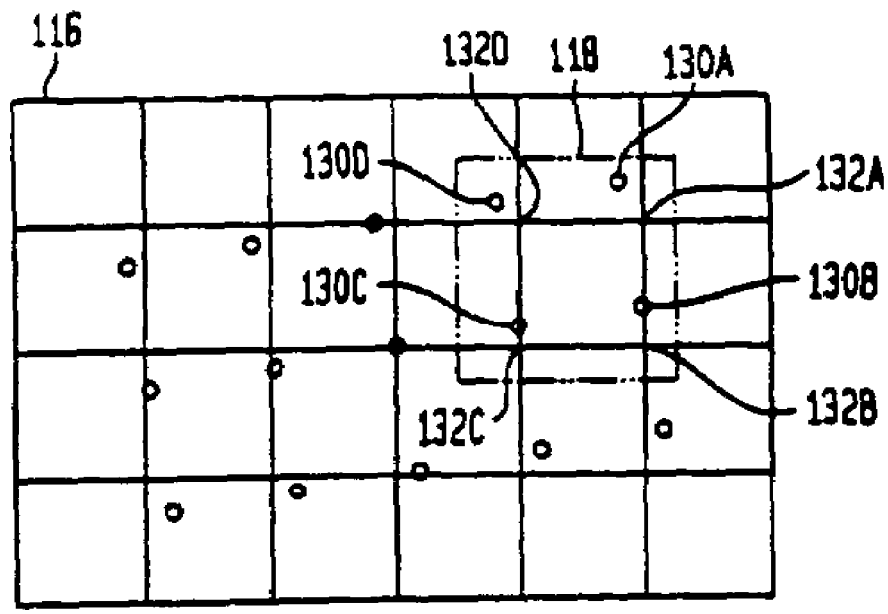
FIGS. 7A and 7B are conceptual diagrams illustrating how the reproduced marker data points of FIG. 6 may be utilized to modify the reproduced frames of data in accordance with one or more aspects of the present invention.

With reference to FIG. 7A, the aggregate frame of data points 116 of FIG. 6 is shown superimposed on a grid, where the intersection points of the grid are the expected positions of the peak data points 130 within the aggregate frame of data points 116 (i.e., assuming that no distortion has taken place). Indeed, the intersection points coincide with the relative positions of the marker data points 104 contained in the original frames of data 108 (FIG. 1). As is clear from FIG. 7A, the distortion in the reproduced frames of data 110 has caused the reproduced marker data points 114 to move from their expected positions to other positions and, therefore, the peak data points 130 are likewise out of their expected position.

At action 204 (FIG. 5), correction information is preferably computed from deviations between the positions of the peak data points 130 and their expected positions (i.e., the intersection points of the grid lines—which is to say the corresponding positions of the marker data points 104 within the N original frames of data). Any of the known techniques for computing the correction information may be utilized without departing from the scope of the invention. For example, the well known bilinear interpolation technique may be employed. Additional details concerning this technique may be found in U.S. Pat. No. 6,285,804, the entire disclosure of which is hereby incorporated by reference.

It is most preferred that the peak data points 130 are grouped into sets of three or more (action 204A), for example, into sets of four, one set 118 being shown in FIG. 7A. It is noted that this grouping preferably results in corresponding groupings of the reproduced marker data points 114 and/or the marker data points 104 of the original frames of data 108. At action 204B comparisons of the positions of the peak data points 130 of each set (e.g., set 118) are made with respect to the associated marker data points 104 of those sets. For example, the position of peak data point 130A of set 118 is preferably compared with the relative position of the associated marker data point 104 (i.e., the expected position 132A). The position of peak data point 130B of set 118 is preferably compared with the position of the associated marker data point 104 (i.e., the expected position 132B). Similar comparisons are made for peak data points 130C and 130D. A set of correction information is preferably computed for set 118 that defines the deviations in the positions of the peak data points 130 and the expected positions of those data points within the set (action 204C).

Figure 7B:
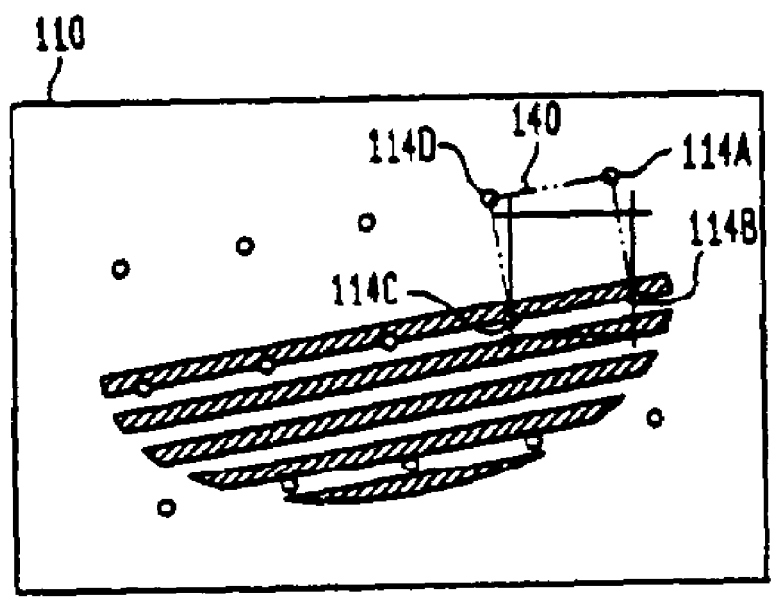

At action 206, the positions of at least some of the data of at least some of the reproduced frames of data 110 are modified using the correction information such that those reproduced frames of data more closely coincide or match with respective ones of the original frames of data 108. For example, with reference to FIG. 7B the set of correction information of set 118 corresponds to a respective area 140 within each of the reproduced frames of data 110. The respective area 140 is that area circumscribed by the reproduced marker data points 114 associated with the peak data points 130 of the set of correction information. More particularly, the area 140 is circumscribed by the reproduced marker data points 114A, 114B, 114C, and 114D. These reproduced marker data points are associated with the peak data points 130A, 130B, 130C, and 130D within set 118 of FIG. 7A. The positions of the data in area 140 are preferably modified in accordance with the set of correction information corresponding to area 140. Similar modifications are preferably made with respect to other sets of correction information and associated areas of the reproduced frames of data 110. It is noted that the correction information applies to all of the reproduced frames of data 110, not only those containing marker data points 114. This is so because it is assumed that the distortion is consistent from frame to frame among the reproduced frames of data 110.

At action 208 (FIG. 5), the embedded watermark 120 within the modified reproduced frames of data is preferably detected using any of the known techniques. In accordance with the invention, the detection of the embedded watermark 120 tends to be more successful at least because the distortion introduced into the reproduced frames of data 110 has been substantially corrected in the modified reproduced frames of data.

Reference is now made to FIG. 8, which is a graphical block diagram illustrating an example of how an embedded watermark 120A contained in one or more frames of data may be detected. In this example, detection is obtained by computing a correlation with respect to a reference watermark 120. It is understood that the embedded watermark 120A is shown without the accompanying content data 112 for the purposes of discussion. It is noted that the embedded watermark 120A exhibits little or no distortion with respect to its expected position due to the modification process 206 (FIG. 5). Thus, the alignment between (or registration of) the embedded watermark 120A and the reference watermark 120 is ideally exact. The contribution by the data values of the embedded watermark 120A to the product of the data values (i.e., pixel values) of the modified reproduced frame of data and the corresponding data values of the reference watermark 120 will be maximized (e.g., shown as a frame of white points 150). The sum of the products of 150 is substantially high when such alignment exists. Detection is thus complete.

Figure 9:
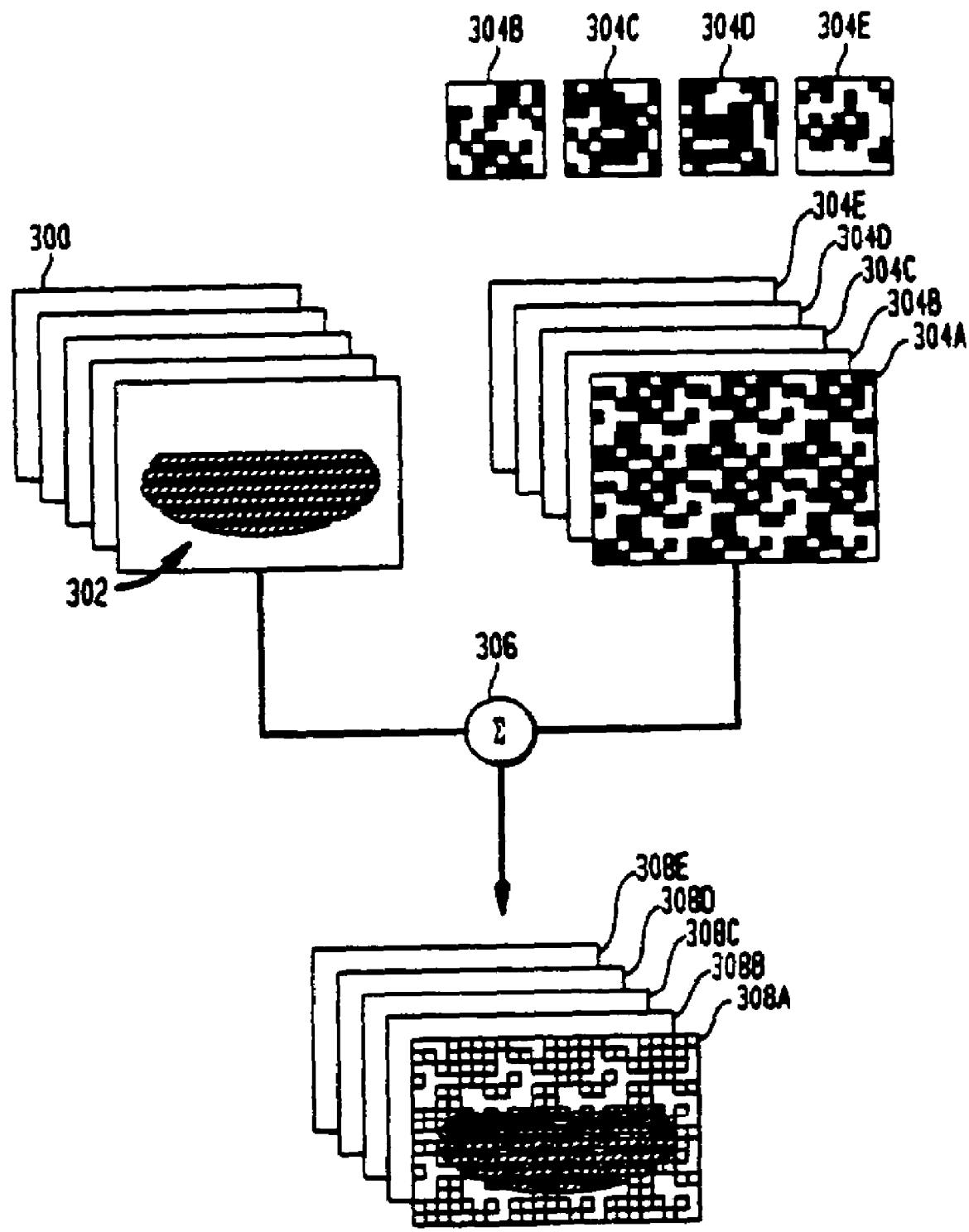
FIG. 9 is a conceptual block diagram illustrating the use of noise blocks with one or more frames of data in accordance with one or more further aspects of the present invention.

Reference is now made to FIG. 9, which is a conceptual diagram illustrating the use of blocks of noise data as opposed to marker data points in the original frames of data. As shown, at least one of the frames of data 300 (which may include content data 302) is aggregated with a plurality of blocks of noise data 304. The summing unit 306 may be employed to perform the aggregation function. The output of the summing unit 306 is preferably N original frames of data 308, where each frame 308 includes the blocks of noise data 304 distributed therewithin.

All of the blocks of noise data 304 within a given one of the N original frames of data 308 are preferably substantial replicas of one another. Although all of the N original frames of data 308 may contain the same blocks of noise data 304, it is preferred that different ones of the N original frames of data 308 contain blocks of noise data 304 that are substantially different from one another. For example, one of the N original frames of data 308A may include blocks of noise data 304A, while another of the N original frames of data 308B preferably includes a plurality of blocks of noise data 304B that are different from blocks of noise data 304A. Similarly, other ones of the N original frames of data 308C, 308D, 308E, etc. preferably contain respective blocks of noise data, such as 304C, 304D, 304E, etc. that are substantially different from one another.

It is preferred that each of the blocks of noise data 304, irrespective of which of the N original frames of data 308 contains it, is of substantially the same size and configuration. For the purposes of discussion, 8 x 8 blocks of noise data 304 are illustrated, although any other size and/or configuration may be employed without departing from the scope of the invention. The blocks of noise data 304 of each of the N original frames of data 308 are preferably located at substantially the same relative positions within each frame 308. In other words, from frame to frame, the blocks of noise data 304 preferably align with one another in terms of their overall perimeters and data points. The magnitudes of the data points, however, may be different from frame to frame at the same relative position when different blocks of noise data 304 are used in different frames 308. It is preferred that a given data point of a block of noise data 304 is of a size that corresponds with the size of the data points of the content data 302. For example, if a data point of the content data 302 is a single pixel, then the size of the data points of the blocks of noise data 304 are preferably also on the order of a single pixel. Practical constraints, however, may dictate that a data point of the blocks of noise data 304 have a size corresponding to two or more pixels.

Figure 10:
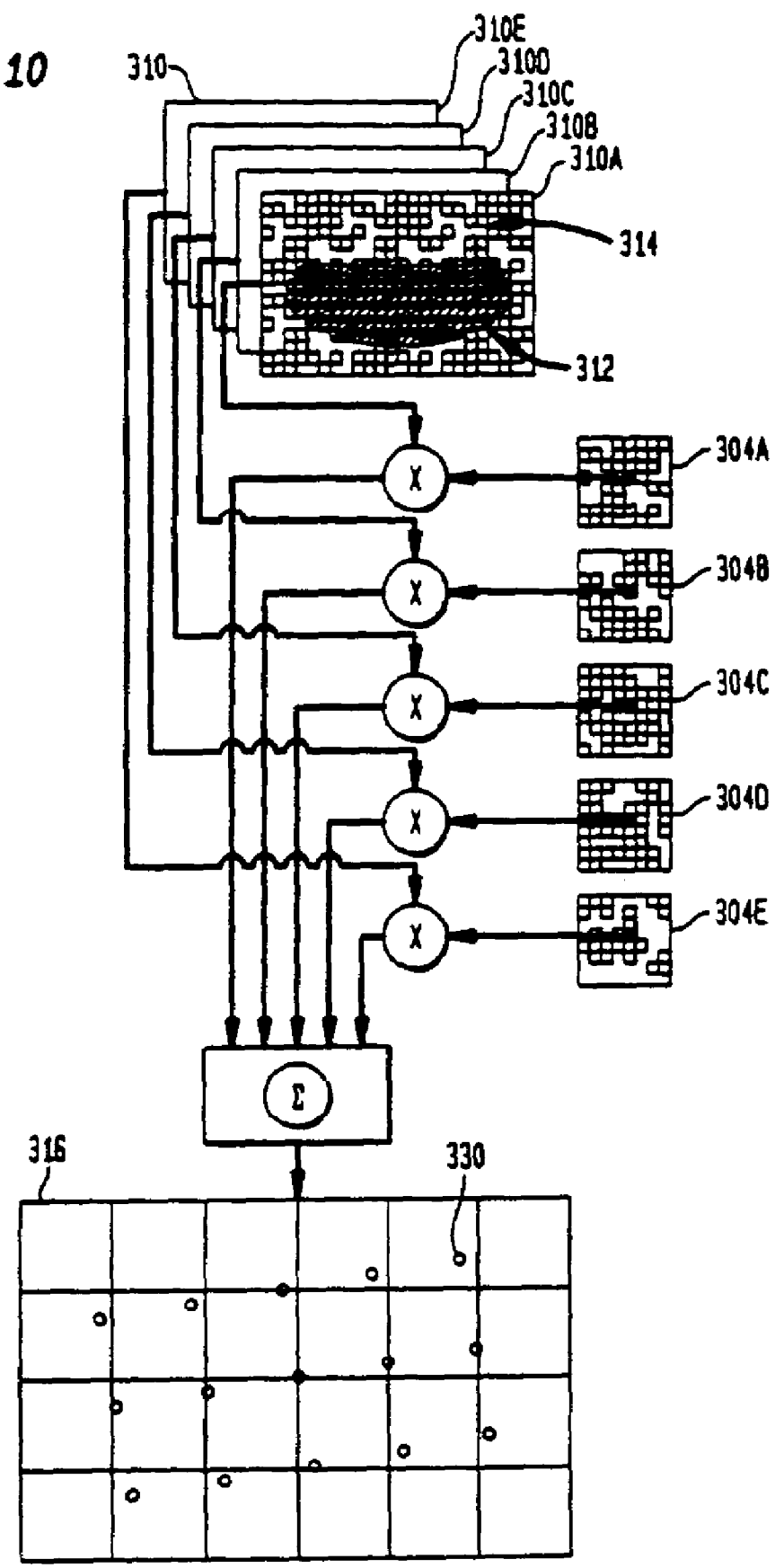
FIG. 10 is a conceptual diagram illustrating how the noise blocks of FIG. 9 may be utilized to derive marker data points in reproduced frames of data in accordance with one or more further aspects of the present invention.

Reference is now made to FIG. 10, which is a conceptual block diagram of a process or system for deriving an aggregate frame of data points 316 from M reproduced frames of data 310. Each of the reproduced frames of data 310 includes reproduced content data 312 and reproduced blocks of noise data 314. The content data 312 and the reproduced blocks of noise data 314 may have been distorted during the process of pirating the original frames of data 308. Assuming that one of the reproduced frames of data 310A corresponds with original frame of data 308A, the block of noise data 304A is used to modify the reproduced frame of data 310A. In particular, one of the data points of the block of noise data 304A is selected and its magnitude is used to multiply substantially all of the data points of the reproduced frame of data 310A. Assuming that another one of the reproduced frames of data 310B corresponds with original frame of data 308B, the block of noise data 304B is used to modify the reproduced frame of data 310B. Indeed, one of the data points of the block of noise data 304B is selected and its magnitude is used to multiply substantially all of the data points of the reproduced frame of data 310B. This process is repeated for the other reproduced frames of data 310C, 310D, 310E, etc. and the associated blocks of noise data 304C, 304D, 304E, etc.

The modified reproduced frames of data are summed on a point-by-point basis to obtain an aggregate frame of data points 316. This process may be stated in general as follows: (i) selecting an i-th one of the noise data of one of the blocks of noise data 304 of an i-th one of the N original frames of data 308, where i=1, 2, . . . N; (ii) multiplying the data of an i-th one of the M reproduced frames of data 310 by the selected one of the noise data to produce an i-th modified reproduced frame of data; and (iii) summing the modified reproduced frames of data on a point-by-point basis to obtain the aggregate frame of data points 316.

When each of the i-th noise data are selected from substantially the same relative positions within the corresponding i-th original frame of data 308 (or substantially the same relative positions within the blocks of noise data 304 of the corresponding i-th original frame of data 308), then the summation of the modified reproduced frames of data will yield peak data points 330 within the aggregate frame of data points 316 at positions that correspond with the selected i-th noise data subject to the distortion. Thus, the peak data points 330 within the aggregate frame of data points 316 provide substantially the same information as the peak data points 130 of the aggregate frame of data points 116 of FIG. 7A. Therefore, the actions and/or functions 202-208 shown in FIG. 5 may be employed to modify the reproduced frames of data 310 and detect the embedded watermark.

Above, a combination of filtering and Fourier transforms are employed to estimate affine geometric deformations of watermarked images and video. However, this process is advantageously modified in one embodiment in order to estimate temporal changes in video due to frame rate conversion or other temporal distortions.

FIG. 11 is a conceptual block diagram illustrating one embodiment of the use of temporally stretched noise blocks in image frames in the present invention. As above, a video noise block frame 400 is divided into noise blocks 410 each representing a substantially identical noise block N1 preferably tiled over substantially all of each video frame. One example of a magnified noise block 420 is shown to exemplify individual pixels 430. In at least some of the previous embodiments described above, the noise block to be included in the noise frame 400 varies with each frame over time, through the entire cycle of noise frames, after which the cycle repeats. Traditional noise frame chart 440 shows this, for example, when the noise cycle is 15 frames, where each noise frame 400 includes noise block N1, N2 . . . N15 respectively, after which the cycle repeats with N1 again.

Additionally, however, an additional repetition rate, or noise block stretch rate T is preferably now included, in this example equal to 3 frames, such that each noise block is repeated in three respective frames before progressing to the next noise block until the cycle (now three times longer) is completed, at which time the cycle repeats itself with later frames. An example of this is shown in stretched noise block frame chart 450, where each of the 15 noise blocks (N=15) is repeated for three frames (T=3).

When the time offset or frame rate of video is changed, the video is effectively temporally re-sampled. This is in some ways analogous to the spatial re-sampling that results from affine spatial transformations described and dealt with above. The patterns described previously were somewhat spatially "low-pass" in nature, or slowly varying with respect to the spatial dimension. However, the previously described patterns were nonetheless sometimes "high-pass" with respect to relatively short periods of time, in the sense that each frame had a completely different noise pattern within each cycle of N noise patterns.

In order to compensate for frame rate changes of temporal distortions, the watermark noise patterns may preferably vary slowly in time in a "low-pass" manner. Thus, two variations on the previously described method of temporally varying noise patterns are provided: (1) the noise pattern preferably does not substantially change from one frame to the next, and (2) any change in the noise pattern preferably takes place at a relatively constant rate or otherwise exhibit a slow rate of change.

There are two basic ways to change between noise blocks over time. First, each noise block can be embedded in T consecutive frames, before changing to the next noise block. This would result, for an initial set of N noise patterns initially added to N video frames, in a revised pattern of T×N frames, where each of the N patterns would repeat for T consecutive frames before moving to the next noise pattern.

Second, one noise block can be "faded" to the next over T frames. The "fade" is preferably monotonic, but can be any slowly varying function. Note that simply embedding each noise block in T frames without fading is just a special case of a more generalized fade function, where the fade is merely a 0 to 1 step function at the point of fade. We can define the fade by a fade function f(t) which is 0 for t=0 and 1 for t=T, such as, for example:

$$f(t)=t/T \qquad \text{(Eq. 1)}$$

or, alternatively, for another example, $$f(t)=\log((t \bmod T)+1)/\log(T) \qquad \text{(Eq. 2)},$$

or to avoid the need for incremental calculations as provided below, for further example, $$f(t)=(t \bmod T)/T \qquad \text{(Eq. 3)}$$

The fade function can also be based on a non-linear function employing gradual transitions, such as functions based on, for example, a 0 to 1 normalized function of a logarithm or based on a sinusoidal function and the like. Additionally, uncorrelated noise can be advantageously added to the noise-block patterns to make them less visible. Such uncorrelated noise will typically not interfere with the workings of the invention.

In one particular example, there are N noise blocks B(0) to B(N−1), each of size n by n, each preferably tiled to cover the entirety of a video frame of the size of each video frame V(t). Then, these N noise blocks are repeatedly embedded into video frames with a cyclic time period of NT. Particularly, 1) At t=0, tiled noise block B(0) is embedded into video frame V(0), such that a revised video frame V'(0) is, for example, $$V'(0)=V(0)+B(0) \qquad \text{(Eq. 4)}$$

2) For 0<t<T, the frame (1−f(t))*B(0)+f(t)*B(1) is embedded into each of video frames V(t), such that, for example:

$$V'(t)=V(t)+(1-(f(t))B(0)+f(t)B(1) \qquad \text{(Eq. 5)}$$

3) For t=T, block B(1) is embedded into video frame V(t), such that, for example:

$$V'(t)=V(t)+B(1) \qquad \text{(Eq. 6)}$$

4) Similarly, for t=j*T to t=(j+1)*T, j=1 to N−2, the frame (1−f(t−j*T))*f(j)+f(t−j*T)*B(j+1) is embedded into video frame V(t), for example:

$$V'(t)=V(t)+(1-f(t-jT))B(j)+f(t-jT)B(j+1) \qquad \text{(Eq. 7)}$$

5) For t=(N−1)*T to t=N*T, the frame (1−f(t−(N−1)*T))*B(N−1)+f(t−(N−1)*T)*f(0) is embedded into video frame V(t), such that, for example:

$$V'(t)=V(t+(1-f(t-(N-1)T))B(N-1)+(f(t-(N-1)T)B(0) \qquad \text{(Eq. 8)}$$

6) Then, the process is repeated until all, or substantially all, video frames have been watermarked, wrapping around from B(N−1) to B(0) every N*T frames.

In one set of nomenclature to describe an embodiment of the present invention, a set of video frames is represented functionally by the representation V(t) for a temporal frame time t, from which a watermarked video frame V'(t) including the noise blocks B may be produced. Thus, given N distinct noise patterns, each to be distributed over T frames per watermark cycle, a cyclic time X is defined in one embodiment as:

$$\tau_{(t)}=t \bmod(NT) \qquad \text{(Eq. 9)}$$

As a result, for every time period zT to (z+1)T for an integer z, the modified watermarked video frame V'(t) can be defined in one embodiment as:

$${}^{t=(z+1)T}_{t=zT} \mid V'(t) = V(t) + \left( \frac{1 - f(\tau_{(t-zT)})}{f(\tau_{(t-zT)})} \right) \cdot (B(\tau_{(zT)}) \quad B(\tau_{((z+1)T)})) \qquad \text{(Eq. 10)}$$

for each period of time zT≦T≦(z+1)T for an integer z, where z typically ranges between 0≦z≦L/T where L is the length in frames of the film to be watermarked.

FIG. 12 is a conceptual block diagram illustrating one embodiment of the fading of temporally stretched noise blocks over a number of frames. A first noise block N1 500 is subjected to a linear fade function B over six frames (t=0 to 5) to create fading first noise blocks 505a-f. A second noise block N2 510 is subjected to the inverse of the linear fade function (1-B) over the six frames t=0 to 5 to create representative fading second noise blocks 515a-f to make it gradually appear. The two faded noise blocks are summed at each frame to create a summed noise block 520 for each of the six frames t=0 to 5 to create six summed noise block frames 525a-f. The summed noise blocks 525a-f are then added to the respective video frames (not shown), although each of the first faded noise blocks 505a-f and second faded noise blocks 515a-f may, for example, be added to respective video frames either separately or after summing in this example embodiment.

The fading function itself may be a linear function 530, or another function that changes gradually between a known lower and upper bound over time such as, for example and without exclusion of other functions, a modified logarithmic function 540 as described in Eq. 2 above, or a normalized sine function 550. For any of these functions, the function is advantageously normalized to move monotonically and continuously between zero and one within a given time period T as described above. The inverse function (1−f(t)) is applied to the subsequent noise block in the repeating cycle of noise blocks, such that an inverted linear function 532, an inverted modified log function 542, or an inverted sine function 552 (typically not an "inverse sine function" as such, but rather the function (1−sin(t)). The summing of the direct and inverted functions over the first noise block N1 and second noise block N2 respectively is shown, in one embodiment, for a linear function 534, a modified log function 544, and a sine function 546. In each of these charts, the vertical axis denotes amplitude between zero and one, and the horizontal axis denotes time between 0 and the noise stretching period T. The charts are approximate and are not meant to be to scale, and are rather included to show the general shape and slope of example fade functions that can be applied in the present invention.

In one example, the video time scale is changed linearly, so that t in the original video corresponds to a linear function:

$$q(t)=a^*t+b \qquad \text{(Eq. 11)}$$

in the modified video. Then, a period of T in the original maps to a period of a*T in the modified video. The parameter a corresponds to a change of time scale, and b to a time shift. It is typically expected that the parameter a will fall in a limited range, at most 0.5 to 2.0, for most frame rate modifications, but other functions are foreseen. The time shift b is generally an arbitrary constant.

In some cases, it may be the case that time scale varies nonlinearly, either due to compression, direct video editing, scaling techniques meant to reduce small periods of video time to provide additional advertisement time, and the like. When this occurs, the changes between consecutive noise blocks may be located as described herein to reliable accuracy, especially when the non-linear temporal variation is small relative to the noise stretching period T.

Figure 13:
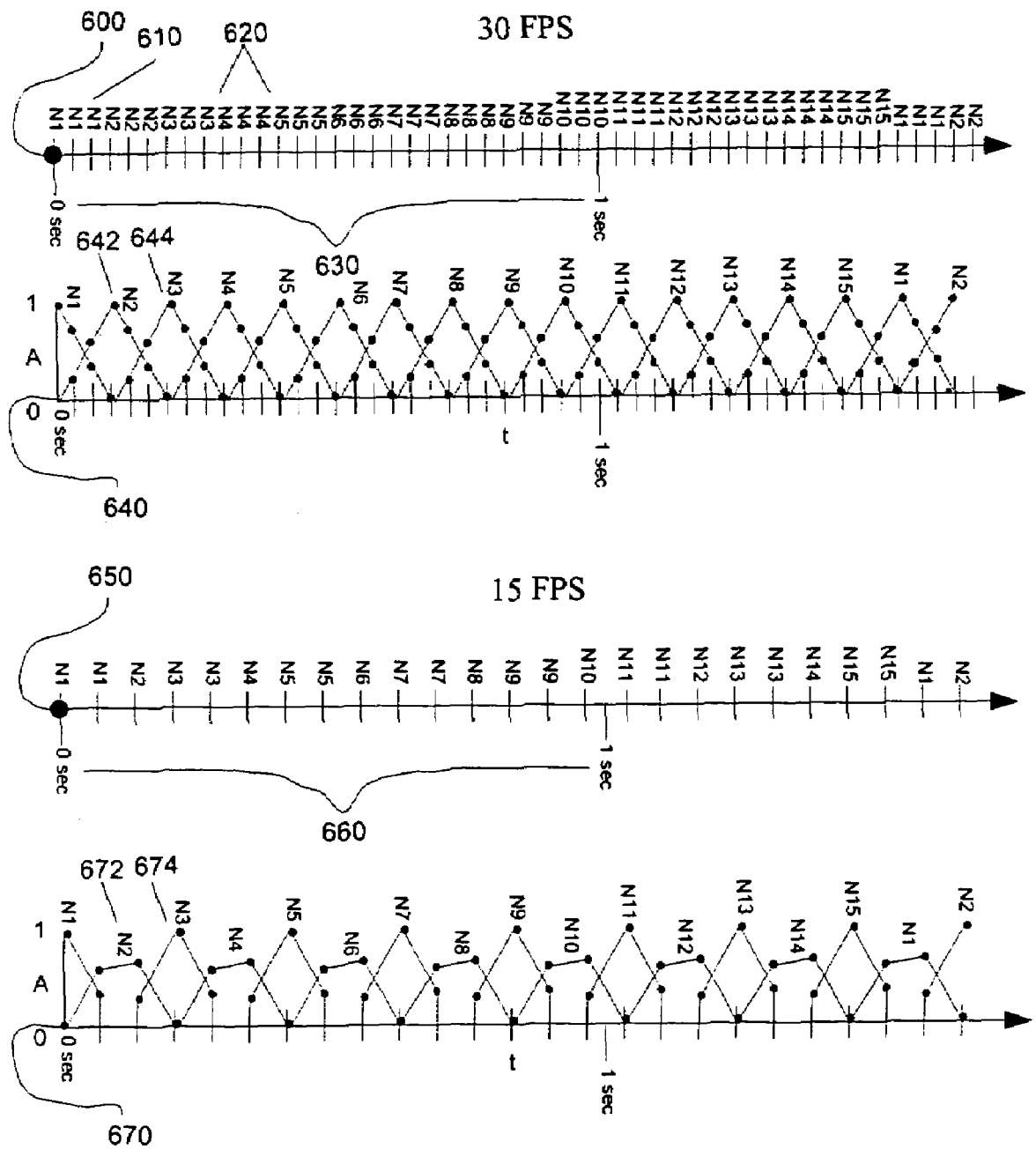
FIG. 13 is a conceptual block diagram illustrating one embodiment of image frames with temporally stretched noise blocks after conversion from an initial frame rate to a new frame rates.

FIG. 13 is a conceptual block diagram illustrating one embodiment of image frames with temporally stretched noise blocks after conversion from an initial frame rate to a new frame rates. In this example embodiment, the noise cycle constitutes N=15 frames, and the noise stretching (repeating) period is T=3 frames. As such, in the present example frame rate conversions removing less than ⅓ of the frames may preserve most of the underlying noise blocks, although noise blocks may be advantageously preserved even when more frames are removed. In the example embodiment of FIG. 13, an initial video segment is provided at 30 frames per second (FPS) and is converted to 15 FPS through the simple process of removing every other frame. While this is a simplified example of frame rate conversion compared to known pull-down and frame rate conversion techniques, it is nonetheless sufficient to demonstrate the preservation of noise blocks after frame rate conversion. A fade function is applied to the noise blocks that is, in this case, linear.

Further in this example embodiment, a set of video frames 600 at 30 FPS includes 15 sequential noise blocks 610 (e.g., N=15) and three noise stretching frames 620, for each noise block (e.g., T=3). Thus, at 30 FPS, thirty individual frames represent one second of video 630. The fade function for the noise blocks 610 in the present example is shown in a fade function chart 640, wherein each noise function reaches a peak point 642, 644 based no the fade function over the noise stretching frames. In the fade function chart 640, the vertical axis represents block amplitude, and the horizontal axis represents frames over time, such that at amplitude 1 a noise block is typically fully present, and at amplitude 0, a noise block is typically fully faded.

After frame rate conversion of the present example embodiment, the resulting converted set of video frames 650 now contain half as many video frames (15 rather than the previous 30) in each second of video 660. The discretizing effect of the conversion in this example embodiment can be seen in the converted video frame function chart 670, where the amplitudes of the noise blocks is effected, but not eliminated, by the frame rate conversion. In particular, now the amplitude of corresponding noise block peak points 672 and 674 are not equal, but both are readily recognizable and have not been eliminated by the frame rate conversion. In addition, although the discretizing effect has reduced the peaks of some noise blocks, the frequency of the fade pattern f(t) and the periodicity of the noise stretching frames T have been advantageously and substantially preserved.

Another possibility sometimes found in video from which watermarks are to be recovered is temporal jitter. The change in time scale may be "noisy", such that, for example, the discretizing effect of changing frame rates results in an uneven, or jittery, time between resulting frames. Depending on the source of such jitter, it may be possible to invert some, but not all, of such a temporal alteration. However, since the rate of change from one noise block to another is slow and changes only over a temporal region of T frames, the system is advantageously robust and typically noise block recovery is not effected by temporal jitter, and especially not effected by temporal jitter that is faster than the period T of fading between sequential noise blocks.

Once the noise has been temporally added to the video content, the underlying watermark can be detected through a detector apparatus used in forensic analysis to investigate piracy, in digital rights management hardware and software, in archival systems to provide indexing, reference and source information, or to keep track of associated files such as revision histories, movie information pages, or informational or communication-related hypertext links.

Before processing by the detector, it is preferable in some embodiments to filter out at least some of the non-watermark video content, in order to leave predominantly watermark patterns. This can be accomplished through spatial filtering (within each frame), temporal filtering (across frames), or both (spatio-temporal filtering) over pixel ranges within and across multiple frames.

Figure 14:
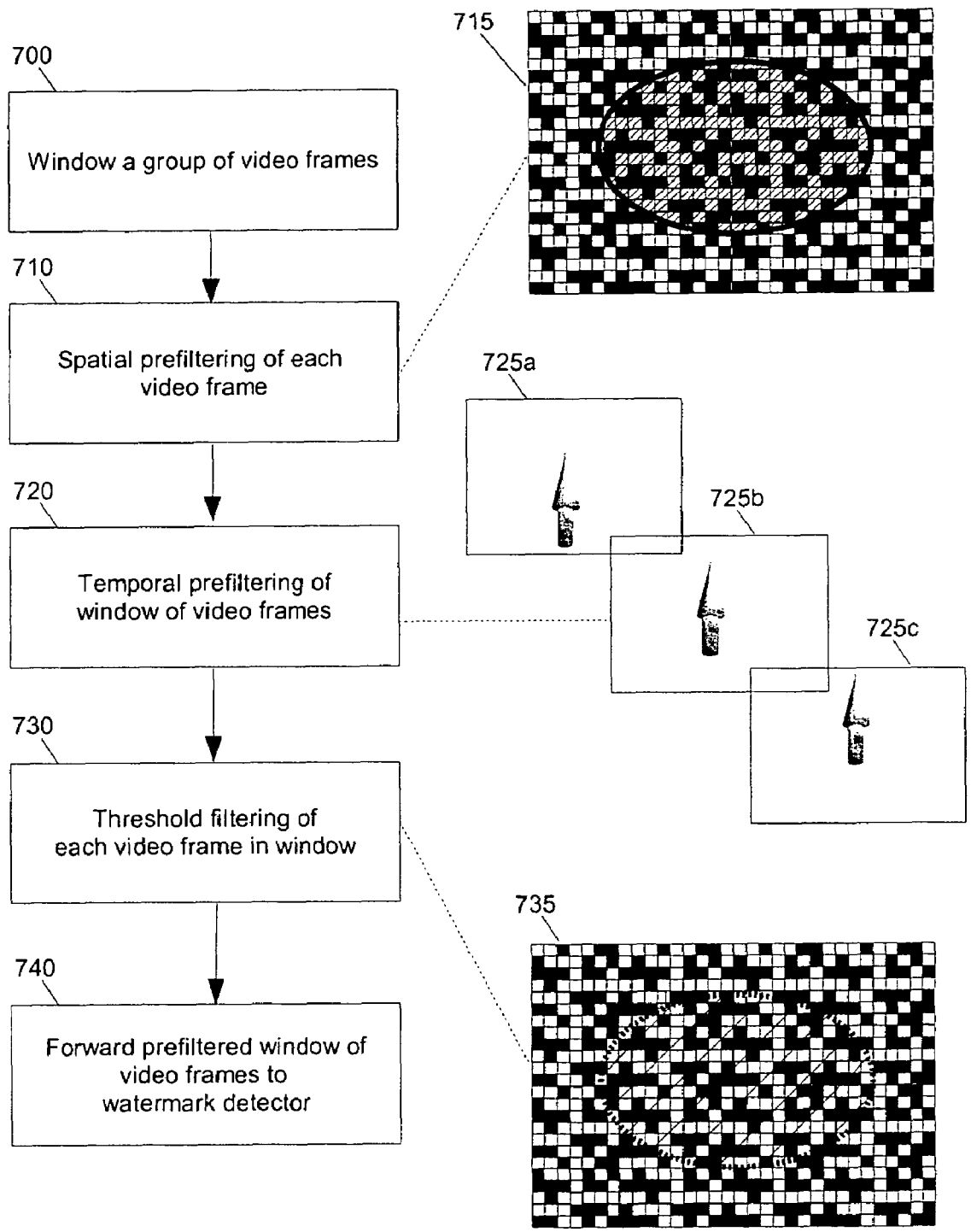
FIG. 14 is a conceptual diagram illustrating one embodiment of the prefiltering of video frames.

FIG. 14 is a conceptual diagram illustrating one embodiment of a general overview of prefiltering of video frames. In one such embodiment, first a window 700 of video frames 715 to be analyzed is selected, typically based on a predetermined window data size, such that the number of frames will vary based on the dimensions of the frames (width, height, bit-depth, compression) to be considered. Then spatial prefiltering 710, as described below, is performed on the window of video frames 715. Next, temporal filtering 720 is performed on the video frames 715 to isolate and remove motion content 725a, 725b and 725c, for example, as described in more detail below. Then, threshold filtering 730 of frames is performed to remove edges and other high-value artifacts as shown, for example, in more detail below. Then, the prefiltered frames 735 are forwarded to the watermark detector for analysis. Although the order described above is preferred, the above order is not necessary and other filter orderings are possible.

Typically, in spatial prefiltering a filter is used to estimate the video content, and then subtract this from the original frame, leaving the embedded watermark, noise and artifacts. Linear filters may be used, but preferably a median filter or some form of "stack filter" is used. Such filters can preserve edges, lines, and other image features, without the blurring that can occur from linear filters. Then, the filtered image is subtracted from the original, typically resulting in less residual image content relative to the watermark noise.

Advantageously, thresholding may be used to further isolate the watermark for detection. For example, watermarks are generally low-pass in nature, so any remaining high-pass values in the difference image may be spurious residual content which may preferably be filtered out for the purposes of watermark detection.

When watermarks consist of noise blocks, they may typically remain in the difference frames. However, with substantially low-pass watermarks, the use of thresholding in order to preserve the watermarks for detection is preferably limited to avoid filtering the watermark noise itself. Spatial filtering, with or without the use of thresholds, may typically work even if the content is geometrically altered. However, spatial filtering is typically more effective when the alteration is smooth overall (except at centers of zoom and rotation, and the like).

Figure 15:
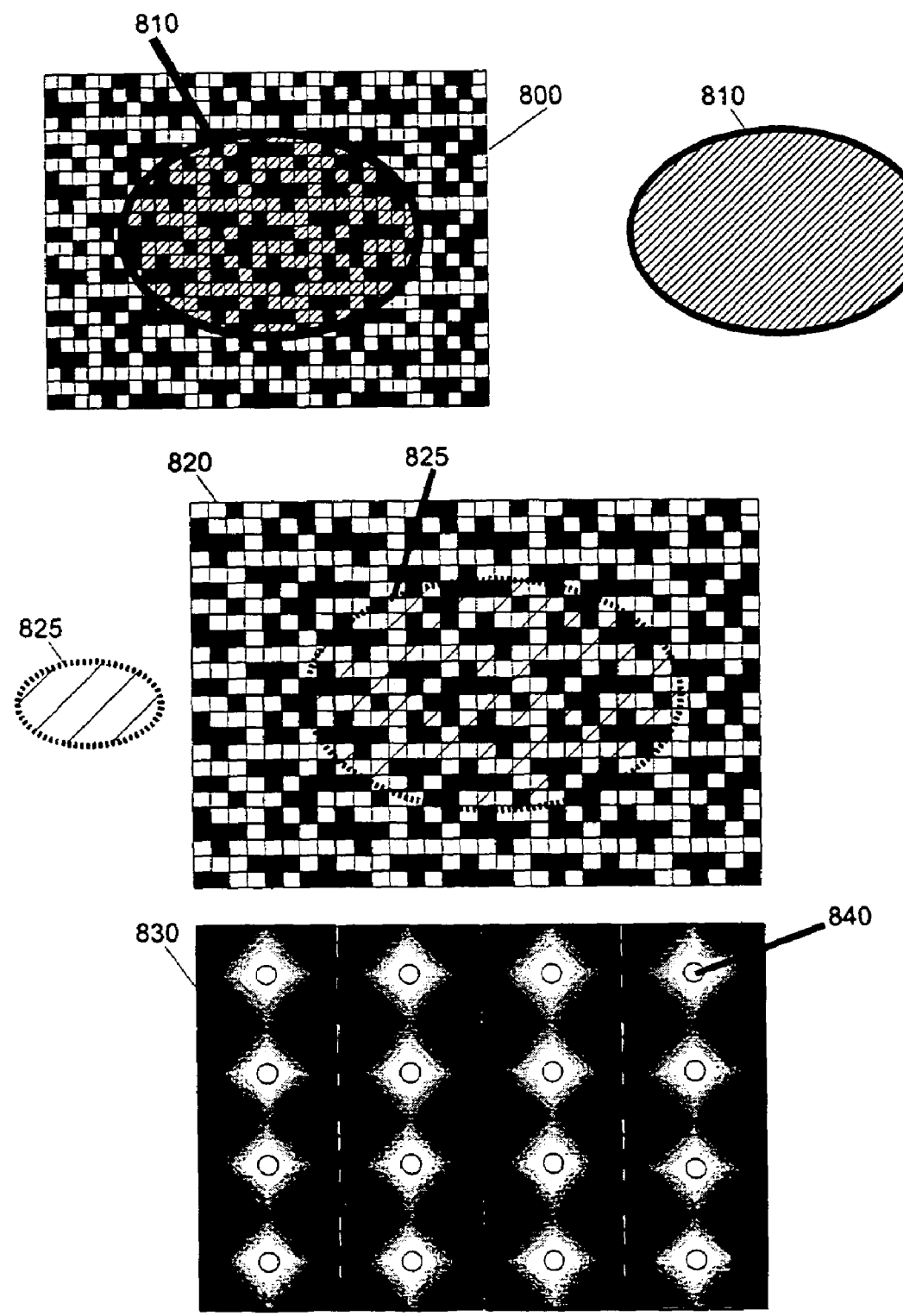
FIG. 15 is a conceptual diagram illustrating one embodiment of spatial prefiltering to estimate and remove video content before decoding.

FIG. 15 is a conceptual diagram illustrating one embodiment of spatial prefiltering and thresholding to estimate and remove video content before decoding. In one such embodiment, a modified video frame 800 includes video content 810. Through spatial filtering, most of the video content may be preferably isolated and removed to create a spatially filtered video frame 820. The spatial filtered video frame 820, however, may include certain video artifacts 825 of the removed video 810 including high-contrast edges and shading. The resulting prefiltered frame, containing the noise blocks, may then be put through a watermark detection process (see FIG. 17) to obtain the noise peaks 840 of a watermark detection output 830.

In addition to or in place of temporal filtering at a watermark detector, it may be advantageous to use temporal prefiltering. The temporal prefiltering process considers just one pixel position in a frame, but that pixel position is considered over time in a series of frames. If a large, smooth object moves through this pixel position, for example, the value at the pixel will typically vary smoothly, until an edge of the object crosses the pixel position. Then the value will typically jump to the value of the neighboring object or background. If the moving object is textured, on the other hand, typically there will be a bit of roughness in the temporal evolution of the value at the fixed pixel position. There may be some noise from video watermarks, capture, format conversion, or other artifacts.

As such, additionally, an "edge-recognizing" filter may be employed in the temporal direction as well as the spatial direction, on all pixel positions in the video frames. The edge-recognizing filter typically preserves motion of non-textured areas, and preserves any still areas of the video. However, it will filter out temporal noise typically matching the characteristics of edges described above. Thus, if filtered frames are subtracted from the originals via such an edge filter, moving textures and any high-frequency temporal noise typically predominantly remain for watermark recovery.

If the remaining noise includes the varying embedded noise blocks, for example, then watermark detection can go forward. However, in some embodiments of the present invention, switching between noise blocks has been slowed through a fade filter and noise block periods where a particular noise block remains for multiple frames, and it is generally disadvantageous for the edge-recognizing filter to recognize and remove these transitions. (In the event of such filtering, the subtracted video will not include our watermark.) This problem can typically be solved by, for example, making the window length of the temporal filter long relative to the transition between noise blocks, and/or by modifying the edge-recognizing filter so that it only recognizes large changes. In the later case, the difference video will typically include small changes, such as for the low-level embedded noise blocks, but large non-watermark changes may be advantageously removed. Throughout the process, the temporal processing of frames can be thought of as mathematical combinations of video frames.

FIG. 16 is a conceptual diagram illustrating one embodiment of temporal prefiltering illustrating to remove large changes is pixels over time before decoding. A set of three modified video frames 900, 920 and 940 are, in this example embodiment, run through a temporal filter. Each modified video frame has respective noise blocks 902, 922 and 942, respective static video elements 906, 926 and 946, respective backgrounds 908, 928 and 948, and respective moving picture elements 904, 924, and 944, although generally speaking the number of backgrounds, elements and video content will obviously vary greatly from video to video and even from frame to frame, and the present simplified example is provided for purposes of explanation. The respective moving picture elements 904, 924 and 944 include a pattern of representative pixels that move in relative position between one frame and the next frame beyond a predetermined threshold, where the predetermined threshold can advantageously be determined based on, for example, original frame rate, noise block cycle rate N, and noise block stretching factor T.

In the present example embodiment, the temporal filter compares adjacent frames, such that in this simple case, for frame 920 moving components of at least frames 900 and 940 are analyzed. For frame 920, a temporal shift representation 930 shows, for example, the moving components 935, relative to a temporal shift representation 910 for frame 900 which shows its moving components 915, and compared to a temporal shift representation 950 for frame 940 which shows its moving components 955. Because the motion rate for the respective moving components 915, 935 and 955 is substantially more than the fade rate for respective noise blocks 902, 922 and 942, the respective motion frames 910, 930 and 950 can be subtracted from the original frames 900, 920 and 940 to remove relatively high-pass temporal motion of pixels while not substantially impairing the underlying noise blocks 902, 922 and 942, via, for example, the temporal filter including a temporal edge filter. As a result, frame 920, for example, would subtract out frame 930, to obtain temporally filtered frame 960. Temporally filtered frame 960 includes the noise block 962 (substantially similar to noise block 922), static video components 966 (substantially similar to video components 926), and a background 968, but the moving video components have been advantageously removed to aide in watermark detection.

Once a watermark is embedded, the watermark detection process is typically initiated at some later time, including, for example, at playback, for piracy detection, or as part of a digital rights management system. In some earlier embodiments of the present invention described above, the watermarked frames were sometimes filtered with a watermark block to emphasize the watermark patterns. Then, the absolute value of the filtered frames was computed to make the results independent of the signs (+ or −) of the embedded watermark blocks. After this, directional accumulation to form 1D signals was sometimes done. Finally, the Fourier transforms of these signals was typically computed and the resulting peaks were analyzed to compute the resizing and shift factors.

In the present embodiment, by comparison, the previous method is inverted to estimate temporal parameters. First, in one embodiment of the present watermark detection technique, the video frames are filtered temporally with an finite impulse response ("FIR") filter whose coefficients match the "fade curve" used to switch between noise blocks in the embedder, as described above. Mathematically, this is typically represented by a temporal correlation of the fade curve with all the fade curves in the embedded sequence of noise blocks.

For example, consider a pixel position in two consecutive noise blocks. If the noise blocks have the same value at this position, there will typically be no change during the fade. If, however, the values differ, the fade curve will be preferably scaled and shifted so that its endpoints match the values of the noise blocks.

Therefore, in one embodiment, after the temporal "fade curve" filter, the output frames will typically have maxima or minima in the center of each fade period, wherever the consecutive noise blocks differ. The locations of maxima and minima will preferably depend on the signs of the changes of component pixels between noise blocks.

In the case of employing a zoom+shift method, the width of the filter may be preferably varied to make it robust to variations in scale. For example, to make it robust to speeding of the video, the window length can be shrunk.

Second, the absolute value of the output frames derived above are preferably computed. This converts the minima into maxima, so that the output peaks are positive.

Third, each absolute value frame found above, the pixels are preferably summed to a single value. This is a 2D spatial accumulation, corresponding to the 1D accumulations in the previously described zoom+shift methods.

As a result, there is typically a single temporal sequence created. This temporal sequence should have a peak at the center of each fade between noise blocks, although sometimes noise and interference may obscure some peaks.

For a linear change in the time scale (or no change), for example, the peaks may be equally spaced. If there is jitter, or if the time-scale change is non-uniform, however, the spacing between consecutive peaks may vary. In fact, if the peaks are obvious, the times of the fades may preferably and advantageously directly be extracted. For example, by averaging consecutive fade locations, the times of the "pure" unfaded noise blocks are preferably estimated from the original sequence. Then, temporal correlation is preferably performed using the frames at these "pure" unfaded noise block times— or, alternatively, for example, the temporal correlation sequence can be spread out with the fades to use all the embedded video frames. Then, when the temporal correlation sequence is preferably aligned with the sequence of embedded noise blocks, the frames of bright spots are advantageously obtained.

Alternatively during this third step, if one divides the sum by the number of pixels in a frame, one may derive an average or mean value for the frame instead of a sum. Based on this mean value, the Central Limit Theorem may be advantageously employed to further refine the frame sequence. Basically, this states that: given N independent, identically distributed Gaussian random variable of mean M and variance V, the mean and variance of the mean of these variables are M and V/N. In other words, in the mean of the sequence of frames, the noise is thus preferably reduced by a factor of 1/N.

Now, simplifying and supposing that the "interference and noise" contributions in a frame to be averaged to one pixel obey the conditions of the Central Limit Theorem, then the variance of such contributions may be preferably reduced by the number of pixels in the image frame. Equivalently, the root mean square ("RMS") amplitude (or standard deviation) of the interference and noise may be advantageously be similarly determined to reduce noise by 1 over the square root of the size of the frame. For a 720×480 DVD-sized frame, the reduction factor is, for example, 1/588, or 0.017. In other words, in such an example, −55 db suppression of noise for each frame is provided.

On the other hand, the contribution from the fades between noise blocks may be the mean absolute difference between the two consecutive noise blocks. For two binary noise blocks, the pixel values may differ in half the cases, so the mean may preferably be 0.5 times the embedded level.

Even if this model based on the Central Limit Theorem is simplistic, the frame-to-pixel summation may advantageously produce a very good signal-to-noise ratio for the temporal sequence that results. This means that the steps that follow should work very well, and the overall performance should be good.

Fourth, if the temporal sequence is noisy, the fast Fourier transform ("FFT") of the sequence may advantageously be computed, and the frequency of the fades may be extracted from this. If the absolute value (magnitude) of the FFT is computed, for example, the resulting peaks will typically correspond to the fundamental and harmonic frequencies of the temporal sequence found in the third step above. The fundamental frequency may be inverted to get the time between consecutive peaks used in step three above. The phase angles of the complex values at the peaks typically thus give the time shifts of the peaks in step three, modulo the computed period.

As such, even if the temporal sequence was noisy, the temporal changes in the video can be advantageously estimated by a number of combinations of the techniques described herein.

For practical reasons, the temporal sequence from step three above is advantageously, in one example, divided into blocks of, for example, 1024 values, and the FFT of each block is then computed. Due to the fact that a one hour video may readily contain more than 200,000 frames (for example, 60 minutes of video at 60 frames per second—or two hours of video at thirty frames per second—are both equal 216,000 frames), computing the FFT of the entire sequence as described herein would typically be much less expensive in time and processor requirements than computing the 2D FFT of one video frame at a time.

However, computing this FFT for the entire sequence from step three above may, in some embodiments, may be unnecessary in some circumstances, such as when it is not desired to wait until then end of the video to detect the watermark at the beginning of the video. Thus, by dividing the video into blocks, one can preferably account for slowly-varying changes in the time scale without the computationally intensive requirements from performing FFTs on each 2D video frame. In the literature, this block-wise FFT is sometimes referred to as a short-term Fourier transform, or STFT.

The mathematics for this stage are typically substantially the same as those used in previous embodiments to compute spatial resizing and shift factors as described previously.

Figure 17:
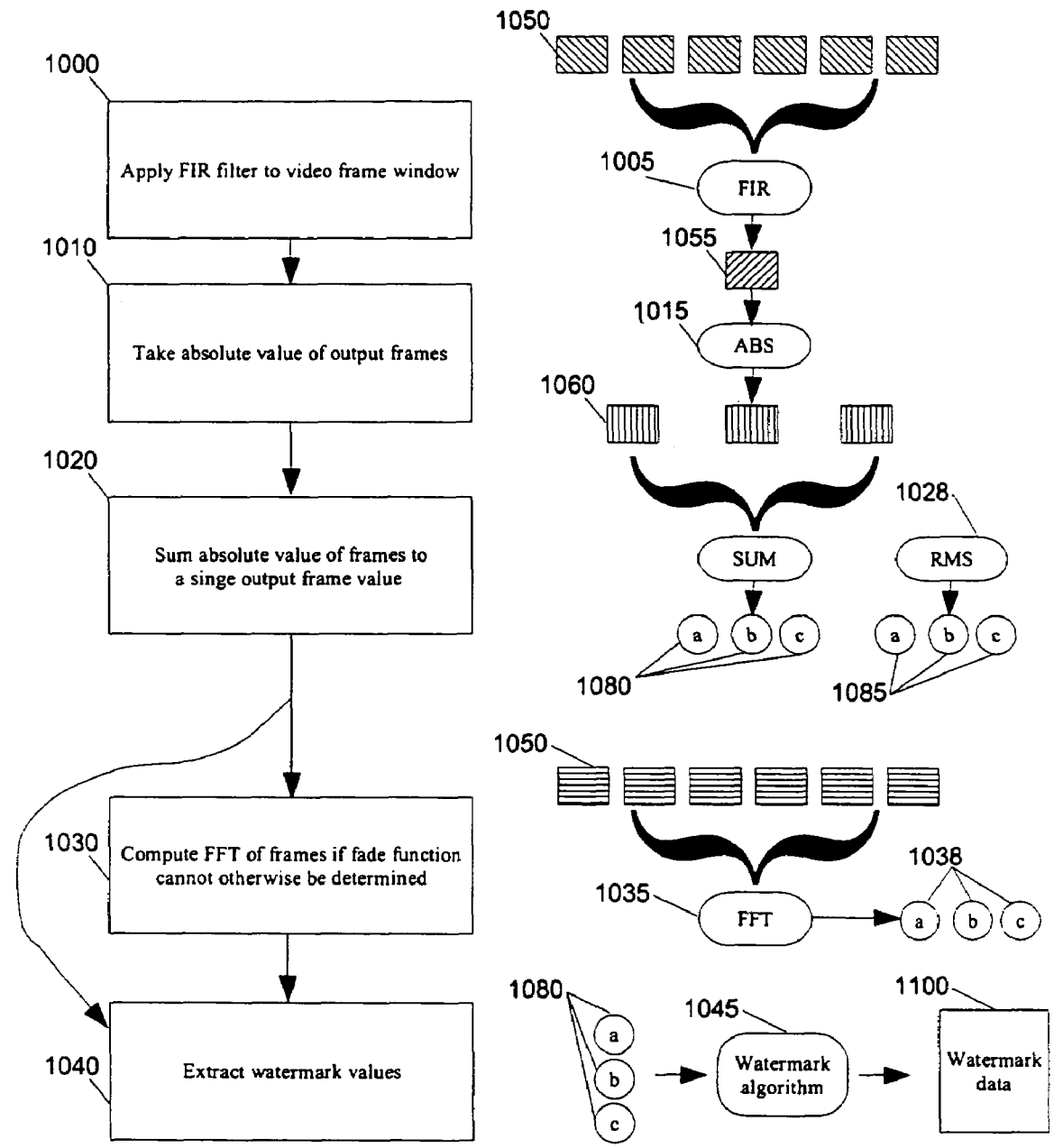
FIG. 17 is a conceptual diagram illustrating one embodiment of the decoding of temporally stretched noise blocks.

FIG. 17 is a conceptual diagram illustrating one embodiment of the decoding of temporally stretched noise blocks. As described above with respect to other example embodiments, in this example embodiment a FIR filter step 1000 including at least one finite impulse response filter 1005 acts on a window of modified video frames 1050. The result of the FIR filter is at least one output frame 1055.

Then, further in this example embodiment in an absolute value determination step 1010, the at least one output frame 1055 is put through an absolute value filter to normalize the output frame 1055 and in particular make the peaks of the output frame 1055 positive.

Then, further in this example embodiment in an output frame value determination step 1020, the sum of values from each output frame 1055 determined as above through a summer 1020, to produce a set of output frame values 1080. Additionally, the root mean square (RMS) of the pixel value in each output frame 1055 may preferably be determined to reduce the background noise level in each frame and improve watermark signal resolution, as described above, through a set of root mean square values 1085 determined through an RMS function 1028.

If the noise block stretch value T and/or the fade function for the modified video frames are not known, then an FFT fade function resolution step 1030 may preferably be performed, wherein a window of modified video frames 1050 is directly analyzed via a fast Fourier transform (FFT) function 1035 to determine a set of FFT output values 1038 in the frequency domain, from which the frequency of the fade window and/or noise block stretching value T may be resolved.

Finally, based on the values determined above, a watermark extraction step 1040 extracts from, for example, the set of output frame values 1080, via a watermark algorithm 1045, a set of watermark data 1100. The watermark algorithm is advantageously any of those described previously or another known watermarking or stegenographic method, and the output watermark data 1100 may be correlated via a database (not shown) or a flag table (not shown) to represent, for example, serial copyright management information, a technical signal to control access to a copyrighted work, other information related to the watermarked video, a link to an external resource (such as a hyperlink) related to the watermarked video, or any other useful information and the like, or the output watermark data 1100 can also be advantageously encrypted itself to be resolved by external software or hardware.

In accordance with at least one further aspect of the present invention, a method and/or apparatus for detecting a watermark among a plurality of reproduced frames of data is contemplated. The method and/or apparatus may be achieved utilizing suitable hardware capable of carrying out the actions and/or functions discussed hereinabove with respect to FIGS. 1-17. Alternatively, the method and/or apparatus may be achieved utilizing any of the known processors that are operable to execute instructions of a software program. In the latter case, the software program preferably causes the processor (and/or any peripheral systems) to execute the actions and/or functions described hereinabove. Still further, the software program may be stored on a suitable storage medium (such as a floppy disk, a memory chip, etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of placing a watermark in a video comprising a plurality of frames, comprising:
    creating a plurality of noise blocks in a repeating sequence representing watermark data;
    adding each noise block to a predetermined number of said plurality video frames;
    fading from each noise block to the next noise block in the repeating sequence over said predetermined number of said plurality video frames via a fading function during said adding step; and,
    repeating said adding and fading step for substantially all of said video frames.

2. The method of claim 1, wherein said fading function is a linear function.

3. The method of claim 1, further comprising the step of tiling each noise block over its respective video frame to fill substantially all of said video frame.

4. The method of claim 1, further comprising the step of adjusting the noise block with respect to the video frames to minimize the visibility of the watermark prior to adding.

5. A system for embedding a watermark in a plurality of video frames over frame time t, comprising:
    a set of video frames V(0) to V(M) where M is an integer and M>1;
    a set of noise blocks B(0) to B(N) where N is an integer and 1<N<M;
    a stretch value T designating the number of video frames a particular noise block is repeated in, where 1<T<N;
    a fade function f(t) for fading between a first noise block and a second noise block in a set of T video frames; and,
    an adder for adding said set of noise blocks B(0) to B(N) repeatedly to each N*T frames of said set of video frames via said fade function.

6. The system of claim 5, wherein said adder uses the function:

$$V'(t) = V(t) + \begin{pmatrix} 1 - f(\tau_{(t-zT)}) \\ f(\tau_{(t-zT)}) \end{pmatrix} \cdot (B(\tau_{(zT)})\ B(\tau_{((z+1)T)}))$$

for each where τ=t mod (N*T), V' (t) is a modified video frame based on each respective video frame V(t), for each integer z such that 0<z<(M/T).

7. The system of claim 5, wherein said adder uses the function:
    at t=0, V' (0)=V(0)=B(0) where V' (x) is a modified video frame with noise added for a video frame V(x) for an integer 0<x<M;
    for 0<t<T, V' (t)=V(t)+(1−(f(t))B(0)+f(t)B(1);
    for t=T, V'(t)+V(t)+B(1)4);
    for t=j*T to t=(j+1)*T, where j is an integer and 1<j<N−2, V' (t)=V(t)+(1−f(t−jT))B(j)+f(t−jT)B(j+1)
    for t=(N−1)*T to t=N*T, V' (t)=V(t+(1−f(t−(N−1)T))B(N−1)+(f(t−(N−1)T)B(0), and repeating the function until wrapping around from B(N−1) to B(0) every N*T frames until t=M.

8. A method of placing a watermark in a video comprising a plurality of frames, comprising:
    creating a plurality of noise blocks in a repeating sequence representing watermark data;
    adding each noise block to a predetermined number of said plurality video frames; and
    fading from each noise block to the next noise block in the repeating sequence over said predetermined number of said plurality video frames via a fading function during said adding step.

\* \* \* \* \*

UNITED STATES PATENT AND TRADEMARK OFFICE
CERTIFICATE OF CORRECTION

PATENT NO.        : 7,433,489 B2                                      Page 1 of 1
APPLICATION NO.   : 10/882055
DATED             : October 7, 2008
INVENTOR(S)       : Peter D. Wendt It is certified that error appears in the above-identified patent and that said Letters Patent is hereby corrected as shown below:

Column 24, line 27, "V(0)=B(0)" should read -- V(0)+B(0) --
Column 24, line 31, "(t)+V" should read -- (t)=V --

Signed and Sealed this

Eleventh Day of May, 2010

David J. Kappos
*Director of the United States Patent and Trademark Office*